(12) United States Patent
el Kaliouby et al.

(10) Patent No.: US 11,073,899 B2
(45) Date of Patent: Jul. 27, 2021

(54) MULTIDEVICE MULTIMODAL EMOTION SERVICES MONITORING

(71) Applicant: Affectiva, Inc., Boston, MA (US)

(72) Inventors: Rana el Kaliouby, Milton, MA (US); Seyedmohammad Mavadati, Watertown, MA (US); Taniya Mishra, New York, NY (US); Timothy Peacock, Concord, MA (US); Gregory Poulin, Acton, MA (US); Panu James Turcot, Pacifica, CA (US)

(73) Assignee: Affectiva, Inc., Boston, MA (US)

( * ) Notice: Subject to any disclaimer, the term of this patent is extended or adjusted under 35 U.S.C. 154(b) by 0 days.

(21) Appl. No.: 16/587,579

(22) Filed: Sep. 30, 2019

(65) Prior Publication Data

US 2020/0026347 A1 Jan. 23, 2020

Related U.S. Application Data

(63) Continuation-in-part of application No. 16/127,618, filed on Sep. 11, 2018, now Pat. No. 10,628,741, and
(Continued)

(51) Int. Cl.
*G06F 3/01* (2006.01)
*G06Q 30/02* (2012.01)
(Continued)

(52) U.S. Cl.
CPC .......... *G06F 3/011* (2013.01); *G06K 9/00315* (2013.01); *G06Q 30/0209* (2013.01);
(Continued)

(58) Field of Classification Search
CPC ............... G06F 3/011; G06F 2303/011; G06Q 30/0209; G06K 9/00315; H04L 51/32; H04L 51/02; H04L 51/10
(Continued)

(56) References Cited

U.S. PATENT DOCUMENTS

| 3,034,500 | A | 5/1962 | Backster, Jr. |
| 3,548,806 | A | 12/1970 | Fisher |

(Continued)

FOREIGN PATENT DOCUMENTS

| JP | 08115367 | 7/1996 |
| KR | 10-2005-0021759 A | 3/2005 |

(Continued)

OTHER PUBLICATIONS

Rana Ayman el Kaliouby, Mind-reading machines: automated inference of complex mental states, Jul. 2005, University of Cambridge, Cambridge, United Kingdom.
(Continued)

*Primary Examiner* — Vernal U Brown
(74) *Attorney, Agent, or Firm* — Adams Intellex, PLC

(57) ABSTRACT

Techniques for multidevice, multimodal emotion services monitoring are disclosed. An expression to be detected is determined. The expression relates to a cognitive state of an individual. Input on the cognitive state of the individual is obtained using a device local to the individual. Monitoring for the expression is performed. The monitoring uses a background process on a device remote from the individual. An occurrence of the expression is identified. The identification is performed by the background process. Notification that the expression was identified is provided. The notification is provided from the background process to a device distinct from the device running the background process. The expression is defined as a multimodal expression. The multimodal expression includes image data and audio data from the individual. The notification enables emotion services to be provided. The emotion services augment messaging, social media, and automated help applications.

28 Claims, 15 Drawing Sheets

Related U.S. Application Data a continuation-in-part of application No. 15/861,855, filed on Jan. 4, 2018, now Pat. No. 10,204,625, and a continuation-in-part of application No. 15/670,791, filed on Aug. 7, 2017, now Pat. No. 10,074,024, which is a continuation-in-part of application No. 15/666,048, filed on Aug. 1, 2017, now abandoned, and a continuation-in-part of application No. 15/395,750, filed on Dec. 30, 2016, which is a continuation-in-part of application No. 15/262,197, filed on Sep. 12, 2016, and a continuation-in-part of application No. 14/796,419, filed on Jul. 10, 2015, now abandoned, and a continuation-in-part of application No. 14/460,915, filed on Aug. 15, 2014, now abandoned, and a continuation-in-part of application No. 13/153,745, filed on Jun. 6, 2011, now abandoned, said application No. 15/666,048 is a continuation-in-part of application No. 15/395,750, filed on Sep. 12, 2016, said application No. 15/670,791 is a continuation-in-part of application No. 14/214,918, filed on Mar. 15, 2014, now Pat. No. 9,723,992, and a continuation-in-part of application No. 13/153,745, filed on Jun. 6, 2011, now abandoned, application No. 16/587,579, which is a continuation-in-part of application No. 14/672,328, filed on Mar. 30, 2015, now abandoned, and a continuation-in-part of application No. 14/460,915, filed on Aug. 15, 2014, now abandoned.

(60) Provisional application No. 62/893,298, filed on Aug. 29, 2019, provisional application No. 62/827,088, filed on Mar. 31, 2019, provisional application No. 62/679,825, filed on Jun. 3, 2018, provisional application No. 62/637,567, filed on Mar. 2, 2018, provisional application No. 62/625,274, filed on Feb. 1, 2018, provisional application No. 62/611,780, filed on Dec. 29, 2017, provisional application No. 62/593,440, filed on Dec. 1, 2017, provisional application No. 62/593,449, filed on Dec. 1, 2017, provisional application No. 62/557,460, filed on Sep. 12, 2017, provisional application No. 62/541,847, filed on Aug. 7, 2017, provisional application No. 62/524,606, filed on Jun. 25, 2017, provisional application No. 62/503,485, filed on May 9, 2017, provisional application No. 62/469,591, filed on Mar. 10, 2017, provisional application No. 62/448,448, filed on Jan. 20, 2017, provisional application No. 62/442,325, filed on Jan. 4, 2017, provisional application No. 62/442,291, filed on Jan. 4, 2017, provisional application No. 62/370,421, filed on Aug. 3, 2016, provisional application No. 62/301,558, filed on Feb. 29, 2016, provisional application No. 62/273,896, filed on Dec. 31, 2015, provisional application No. 62/265,937, filed on Dec. 10, 2015, provisional application No. 62/222,518, filed on Sep. 23, 2015, provisional application No. 62/217,872, filed on Sep. 12, 2015, provisional application No. 62/128,974, filed on Mar. 5, 2015, provisional application No. 62/082,579, filed on Nov. 20, 2014, provisional application No. 62/047,508, filed on Sep. 8, 2014, provisional application No. 62/023,800, filed on Jul. 11, 2014, provisional application No. 61/972,314, filed on Mar. 30, 2014, provisional application No. 61/953,878, filed on Mar. 16, 2014, provisional application No. 61/927,481, filed on Jan. 15, 2014, provisional application No. 61/924,252, filed on Jan. 7, 2014, provisional application No. 61/916,190, filed on Dec. 14, 2013, provisional application No. 61/867,007, filed on Aug. 16, 2013, provisional application No. 61/467,209, filed on Mar. 24, 2011, provisional application No. 61/447,464, filed on Feb. 28, 2011, provisional application No. 61/447,089, filed on Feb. 27, 2011, provisional application No. 61/439,913, filed on Feb. 6, 2011, provisional application No. 61/414,451, filed on Nov. 17, 2010, provisional application No. 61/388,002, filed on Sep. 30, 2010, provisional application No. 61/352,166, filed on Jun. 7, 2010, provisional application No. 62/439,928, filed on Dec. 29, 2016, provisional application No. 61/927,481, filed on Jan. 15, 2014, provisional application No. 61/924,252, filed on Jan. 7, 2014, provisional application No. 61/916,190, filed on Dec. 14, 2013, provisional application No. 61/844,478, filed on Jul. 10, 2013, provisional application No. 61/789,038, filed on Mar. 15, 2013, provisional application No. 61/790,461, filed on Mar. 15, 2013, provisional application No. 61/793,761, filed on Mar. 15, 2013, provisional application No. 61/798,731, filed on Mar. 15, 2013, provisional application No. 62/128,974, filed on Mar. 5, 2015, provisional application No. 62/082,579, filed on Nov. 20, 2014, provisional application No. 62/047,508, filed on Sep. 8, 2014.

(51) Int. Cl.
*H04L 12/58* (2006.01)
*G06K 9/00* (2006.01)

(52) U.S. Cl.
CPC .............. *H04L 51/02* (2013.01); *H04L 51/10* (2013.01); *H04L 51/32* (2013.01); *G06F 2203/011* (2013.01)

(58) Field of Classification Search
USPC ........................................................ 340/439
See application file for complete search history.

(56) References Cited

U.S. PATENT DOCUMENTS

| | | |
|---|---|---|
| 3,870,034 A | 3/1975 | James |
| 4,353,375 A | 10/1982 | Colburn et al. |
| 4,448,203 A | 5/1984 | Williamson et al. |
| 4,794,533 A | 12/1988 | Cohen |
| 4,807,642 A | 2/1989 | Brown |
| 4,817,628 A | 4/1989 | Zealear et al. |
| 4,950,069 A | 8/1990 | Hutchinson |
| 4,964,411 A | 10/1990 | Johnson et al. |
| 5,016,282 A | 5/1991 | Tomono et al. |
| 5,031,228 A | 7/1991 | Lu |
| 5,219,322 A | 6/1993 | Weathers |
| 5,247,938 A | 9/1993 | Silverstein et al. |
| 5,259,390 A | 11/1993 | Maclean |
| 5,507,291 A | 4/1996 | Stirbl et al. |
| 5,572,596 A | 11/1996 | Wildes et al. |
| 5,619,571 A | 4/1997 | Sandstorm et al. |
| 5,647,834 A | 7/1997 | Ron |
| 5,649,061 A | 7/1997 | Smyth |
| 5,663,900 A | 9/1997 | Bhandari et al. |
| 5,666,215 A | 9/1997 | Fredlund et al. |
| 5,725,472 A | 3/1998 | Weathers |
| 5,741,217 A | 4/1998 | Gero |
| 5,760,917 A | 6/1998 | Sheridan |
| 5,762,611 A | 6/1998 | Lewis et al. |
| 5,772,508 A | 6/1998 | Sugita et al. |
| 5,772,591 A | 6/1998 | Cram |
| 5,774,591 A * | 6/1998 | Black ................ G06K 9/00248 382/118 |

(56) References Cited

U.S. PATENT DOCUMENTS

| | | | |
|---|---|---|---|
| 5,802,220 A | 9/1998 | Black et al. |
| 5,825,355 A | 10/1998 | Palmer et al. |
| 5,886,683 A | 3/1999 | Tognazzini et al. |
| 5,898,423 A | 4/1999 | Tognazzini et al. |
| 5,920,477 A | 7/1999 | Hoffberg et al. |
| 5,945,988 A | 8/1999 | Williams et al. |
| 5,959,621 A | 9/1999 | Nawaz et al. |
| 5,969,755 A | 10/1999 | Courtney |
| 5,983,129 A | 11/1999 | Cowan et al. |
| 5,987,415 A | 11/1999 | Breese et al. |
| 6,004,061 A | 12/1999 | Manico et al. |
| 6,004,312 A | 12/1999 | Finneran et al. |
| 6,008,817 A | 12/1999 | Gilmore, Jr. |
| 6,026,321 A | 2/2000 | Miyata et al. |
| 6,026,322 A | 2/2000 | Korenman et al. |
| 6,056,781 A | 5/2000 | Wassick et al. |
| 6,067,565 A | 5/2000 | Horvitz |
| 6,088,040 A | 7/2000 | Oda et al. |
| 6,091,334 A | 7/2000 | Galiana et al. |
| 6,099,319 A | 8/2000 | Zaltman et al. |
| 6,134,644 A | 10/2000 | Mayuzumi et al. |
| 6,182,098 B1 | 1/2001 | Selker |
| 6,185,534 B1 | 2/2001 | Breese et al. |
| 6,195,651 B1 | 2/2001 | Handel et al. |
| 6,212,502 B1 | 4/2001 | Ball et al. |
| 6,222,607 B1 | 4/2001 | Szajewski et al. |
| 6,309,342 B1 | 10/2001 | Blazey et al. |
| 6,327,580 B1 | 12/2001 | Pierce et al. |
| 6,349,290 B1 | 2/2002 | Horowitz et al. |
| 6,351,273 B1 | 2/2002 | Lemelson et al. |
| 6,437,758 B1 | 8/2002 | Nielsen et al. |
| 6,443,840 B2 | 9/2002 | Von Kohorn |
| 6,530,082 B1 | 3/2003 | Del Sesto et al. |
| 6,577,329 B1 | 6/2003 | Flickner et al. |
| 6,606,102 B1 | 8/2003 | Odom |
| 6,629,104 B1 | 9/2003 | Parulski et al. |
| 6,792,458 B1 | 9/2004 | Muret et al. |
| 6,847,376 B2 | 1/2005 | Engeldrum et al. |
| 7,000,237 B1 | 2/2006 | Sinha |
| 7,003,135 B2 | 2/2006 | Hsieh et al. |
| 7,013,478 B1 | 3/2006 | Hendricks et al. |
| 7,113,916 B1 | 9/2006 | Hill |
| 7,120,880 B1 * | 10/2006 | Dryer ............ G06Q 30/02 715/863 |
| 7,197,459 B1 | 3/2007 | Harinarayan et al. |
| 7,233,684 B2 | 6/2007 | Fedorovskaya et al. |
| 7,246,081 B2 | 7/2007 | Hill |
| 7,263,474 B2 | 8/2007 | Fables et al. |
| 7,266,582 B2 | 9/2007 | Stelting |
| 7,307,636 B2 | 12/2007 | Matraszek et al. |
| 7,319,779 B1 | 1/2008 | Mummareddy et al. |
| 7,327,505 B2 | 2/2008 | Fedorovskaya et al. |
| 7,350,138 B1 | 3/2008 | Swaminathan et al. |
| 7,353,399 B2 | 4/2008 | Ooi et al. |
| 7,355,627 B2 | 4/2008 | Yamazaki et al. |
| 7,428,318 B1 | 9/2008 | Madsen et al. |
| 7,474,801 B2 | 1/2009 | Teo et al. |
| 7,496,622 B2 | 2/2009 | Brown et al. |
| 7,549,161 B2 | 6/2009 | Poo et al. |
| 7,551,755 B1 | 6/2009 | Steinberg et al. |
| 7,555,148 B1 | 6/2009 | Steinberg et al. |
| 7,558,408 B1 | 7/2009 | Steinberg et al. |
| 7,564,994 B1 | 7/2009 | Steinberg et al. |
| 7,573,439 B2 | 8/2009 | Lau et al. |
| 7,580,512 B2 | 8/2009 | Batni et al. |
| 7,584,435 B2 | 9/2009 | Bailey et al. |
| 7,587,068 B1 | 9/2009 | Steinberg et al. |
| 7,610,289 B2 | 10/2009 | Muret et al. |
| 7,620,934 B2 | 11/2009 | Falter et al. |
| 7,644,375 B1 | 1/2010 | Anderson et al. |
| 7,676,574 B2 | 3/2010 | Glommen et al. |
| 7,757,171 B1 | 7/2010 | Wong et al. |
| 7,826,657 B2 | 11/2010 | Zhang et al. |
| 7,830,570 B2 | 11/2010 | Morita et al. |
| 7,881,493 B1 | 2/2011 | Edwards et al. |
| 7,921,036 B1 | 4/2011 | Sharma |
| 8,010,458 B2 | 8/2011 | Galbreath et al. |
| 8,022,831 B1 | 9/2011 | Wood-Eyre |
| 8,219,438 B1 | 7/2012 | Moon et al. |
| 8,401,248 B1 | 3/2013 | Moon et al. |
| 8,442,638 B2 | 5/2013 | Libbus et al. |
| 8,522,779 B2 | 9/2013 | Lee et al. |
| 8,600,120 B2 | 12/2013 | Gonion et al. |
| 8,640,021 B2 | 1/2014 | Perez et al. |
| 2001/0033286 A1 | 10/2001 | Stokes et al. |
| 2001/0041021 A1 | 11/2001 | Boyle et al. |
| 2002/0007249 A1 | 1/2002 | Cranley |
| 2002/0030665 A1 | 3/2002 | Ano |
| 2002/0042557 A1 | 4/2002 | Bensen et al. |
| 2002/0054174 A1 | 5/2002 | Abbott et al. |
| 2002/0084902 A1 | 7/2002 | Zadrozny et al. |
| 2002/0171551 A1 | 11/2002 | Eshelman |
| 2002/0182574 A1 | 12/2002 | Freer |
| 2003/0035567 A1 | 2/2003 | Chang et al. |
| 2003/0037041 A1 | 2/2003 | Hertz |
| 2003/0060728 A1 | 3/2003 | Mandigo |
| 2003/0093784 A1 | 5/2003 | Dimitrova et al. |
| 2003/0182123 A1 | 9/2003 | Mitsuyoshi |
| 2003/0191682 A1 | 10/2003 | Shepard et al. |
| 2003/0191816 A1 | 10/2003 | Landress et al. |
| 2004/0181457 A1 | 9/2004 | Biebesheimer |
| 2004/0249821 A1 | 12/2004 | Nies et al. |
| 2005/0187437 A1 | 8/2005 | Matsugu |
| 2005/0283055 A1 | 12/2005 | Shirai et al. |
| 2005/0289582 A1 | 12/2005 | Tavares et al. |
| 2006/0019224 A1 | 1/2006 | Behar et al. |
| 2006/0143647 A1 | 6/2006 | Bill |
| 2006/0170945 A1 | 8/2006 | Bill |
| 2006/0235753 A1 | 10/2006 | Kameyama |
| 2007/0167689 A1 | 7/2007 | Ramadas et al. |
| 2007/0173733 A1 | 7/2007 | Le et al. |
| 2007/0239787 A1 | 10/2007 | Cunningham et al. |
| 2007/0255831 A1 | 11/2007 | Hayashi et al. |
| 2007/0265507 A1 | 11/2007 | de Lemos |
| 2007/0299964 A1 | 12/2007 | Wong et al. |
| 2008/0059570 A1 | 3/2008 | Bill |
| 2008/0091512 A1 | 4/2008 | Marci et al. |
| 2008/0091515 A1 | 4/2008 | Thieberger et al. |
| 2008/0101660 A1 | 5/2008 | Seo |
| 2008/0103784 A1 | 5/2008 | Wong et al. |
| 2008/0184170 A1 | 7/2008 | Periyalwar |
| 2008/0201144 A1 | 8/2008 | Song et al. |
| 2008/0208015 A1 * | 8/2008 | Morris ............ A61B 5/0022 600/301 |
| 2008/0221472 A1 | 9/2008 | Lee et al. |
| 2008/0287821 A1 | 11/2008 | Jung et al. |
| 2008/0292151 A1 | 11/2008 | Kurtz et al. |
| 2009/0002178 A1 | 1/2009 | Guday et al. |
| 2009/0006206 A1 | 1/2009 | Groe |
| 2009/0083421 A1 | 3/2009 | Glommen et al. |
| 2009/0094286 A1 | 4/2009 | Lee et al. |
| 2009/0112694 A1 | 4/2009 | Jung et al. |
| 2009/0112810 A1 | 4/2009 | Jung et al. |
| 2009/0133048 A1 | 5/2009 | Gibbs et al. |
| 2009/0150919 A1 | 6/2009 | Lee et al. |
| 2009/0156907 A1 | 6/2009 | Jung et al. |
| 2009/0164132 A1 | 6/2009 | Jung et al. |
| 2009/0193344 A1 | 7/2009 | Smyers |
| 2009/0210290 A1 | 8/2009 | Elliott et al. |
| 2009/0217315 A1 | 8/2009 | Malik et al. |
| 2009/0259518 A1 | 10/2009 | Harvey |
| 2009/0270170 A1 | 10/2009 | Patton |
| 2009/0271417 A1 | 10/2009 | Toebes et al. |
| 2009/0285456 A1 | 11/2009 | Moon et al. |
| 2009/0299840 A1 | 12/2009 | Smith |
| 2010/0070523 A1 | 3/2010 | Delgo et al. |
| 2010/0086215 A1 | 4/2010 | Bartlett et al. |
| 2010/0099955 A1 | 4/2010 | Thomas et al. |
| 2010/0266213 A1 | 10/2010 | Hill |
| 2010/0274847 A1 | 10/2010 | Anderson et al. |
| 2010/0324437 A1 | 12/2010 | Freeman |
| 2011/0007174 A1 | 1/2011 | Bacivarov et al. |
| 2011/0126226 A1 | 5/2011 | Makhlouf |
| 2011/0134026 A1 | 6/2011 | Kang et al. |

(56) References Cited

U.S. PATENT DOCUMENTS

| | | |
|---|---|---|
| 2011/0143728 A1 | 6/2011 | Holopainen et al. |
| 2011/0144971 A1 | 6/2011 | Danielson |
| 2011/0196855 A1 | 8/2011 | Wable et al. |
| 2011/0218950 A1 | 9/2011 | Mirowski et al. |
| 2011/0231240 A1 | 9/2011 | Schoen et al. |
| 2011/0251493 A1 | 10/2011 | Poh et al. |
| 2011/0263946 A1 | 10/2011 | el Kaliouby et al. |
| 2012/0324491 A1 | 12/2012 | Bathiche et al. |
| 2013/0023337 A1 | 1/2013 | Bowers et al. |
| 2013/0116587 A1 | 5/2013 | Sornmo et al. |
| 2013/0197409 A1 | 8/2013 | Baxter et al. |
| 2013/0337421 A1 | 12/2013 | Gerken, III |
| 2014/0172910 A1 | 6/2014 | Jung et al. |
| 2016/0104486 A1 | 4/2016 | Penilla et al. |
| 2017/0003784 A1 | 1/2017 | Garg et al. |

FOREIGN PATENT DOCUMENTS

| | | |
|---|---|---|
| KR | 10-2008-0016303 A | 2/2008 |
| KR | 1020100048688 A | 5/2010 |
| WO | WO 2011/045422 A1 | 4/2011 |

OTHER PUBLICATIONS

International Search Report dated Nov. 14, 2011 for PCT/US2011/39282.

International Search Report dated Apr. 16, 2012 for PCT/US2011/054125.

International Search Report dated May 24, 2012 for PCT/US2011/060900.

Xiaoyu Wang, An HOG-LBP human detector with partial occlusion handling, Sep. 29, 2009, IEEE 12th International Conference on Computer Vision, Kyoto, Japan.

Zhihong Zeng, A Survey of Affect Recognition Methods: Audio, Visual, and Spontaneous Expressions, Jan. 2009, IEEE Transactions on Pattern Analysis and Machine Intelligence, vol. 31, No. 1.

Nicholas R. Howe and Amanda Ricketson, Improving the Boosted Correlogram, 2004, Lecture Notes in Computer Science, ISSN 0302-9743, Springer-Verlag, Germany.

Xuming He, et al, Learning and Incorporating Top-Down Cues in Image Segmentation, 2006, Lecture Notes in Computer Science, ISBN 978-3-540-33832-1, Springer-Verlag, Germany.

Ross Eaton, et al, Rapid Training of Image Classifiers through Adaptive, Multi-frame Sampling Methods, Oct. 2008, IEEE 37th Applied Imagery Pattern Recognition Workshop, Washington DC.

Verkruysse, Wim, Lars O. Svaasand, and J. Stuart Nelson. "Remote plethysmographic imaging using ambient light." Optics express 16.26 (2008): 21434-21445.

Albiol, Alberto, et al. "Face recognition using HOG-EBGM." Pattern Recognition Letters 29.10 (2008): 1537-1543.

Fasel, B. (Aug. 2002). Robust face analysis using convolutional neural networks. In Object recognition supported by user interaction for service robots (vol. 2, pp. 40-43). IEEE.

Matsugu, M., Mori, K., Mitari, Y., & Kaneda, Y. (2003). Subject independent facial expression recognition with robust face detection using a convolutional neural network. Neural Networks, 16(5-6), 555-559.

* cited by examiner

MULTIDEVICE MULTIMODAL EMOTION SERVICES MONITORING

RELATED APPLICATIONS

This application claims the benefit of U.S. provisional patent applications "Image Analysis for Human Perception Artificial Intelligence" Ser. No. 62/827,088, filed Mar. 31, 2019, and "Vehicle Interior Object Management" Ser. No. 62/893,298, filed Aug. 29, 2019.

This application is also a continuation-in-part of U.S. patent application "Multimodal Machine Learning for Emotion Metrics" Ser. No. 16/127,618, filed Sep. 11, 2018, which claims the benefit of U.S. provisional patent applications "Multimodal Machine Learning for Emotion Metrics" Ser. No. 62/557,460, filed Sep. 12, 2017, "Speech Analysis for Cross-Language Mental State Identification" Ser. No. 62/593,449, filed Dec. 1, 2017, "Avatar Image Animation using Translation Vectors" Ser. No. 62/593,440, filed Dec. 1, 2017, "Directed Control Transfer for Autonomous Vehicles" Ser. No. 62/611,780, filed Dec. 29, 2017, "Cognitive State Vehicle Navigation Based on Image Processing" Ser. No. 62/625,274, filed Feb. 1, 2018, "Cognitive State Based Vehicle Manipulation Using Near Infrared Image Processing" Ser. No. 62/637,567, filed Mar. 2, 2018, and "Vehicle Manipulation Using Cognitive State" Ser. No. 62/679,825, filed Jun. 3, 2018.

The patent application "Multimodal Machine Learning for Emotion Metrics" Ser. No. 16/127,618, filed Sep. 11, 2018 is also a continuation-in-part of "Audio Analysis Learning using Video Data" Ser. No. 15/861,855, filed Jan. 4, 2018, which claims the benefit of U.S. provisional patent applications "Audio Analysis Learning using Video Data" Ser. No. 62/442,325, filed Jan. 4, 2017, "Smart Toy Interaction using Image Analysis" Ser. No. 62/442,291, filed Jan. 4, 2017, "Vehicle Manipulation using Occupant Image Analysis" Ser. No. 62/448,448, filed Jan. 20, 2017, "Image Analysis for Two-sided Data Hub" Ser. No. 62/469,591, filed Mar. 10, 2017, "Vehicle Artificial Intelligence Evaluation of Mental States" Ser. No. 62/503,485, filed May 9, 2017, "Image Analysis for Emotional Metric Generation" Ser. No. 62/524,606, filed Jun. 25, 2017, "Image Analysis and Representation for Emotional Metric Threshold Evaluation" Ser. No. 62/541,847, filed Aug. 7, 2017, "Multimodal Machine Learning for Emotion Metrics" Ser. No. 62/557,460, filed Sep. 12, 2017, "Speech Analysis for Cross-Language Mental State Identification" Ser. No. 62/593,449, filed Dec. 1, 2017, "Avatar Image Animation using Translation Vectors" Ser. No. 62/593,440, filed Dec. 1, 2017, and "Directed Control Transfer for Autonomous Vehicles" Ser. No. 62/611,780, filed Dec. 29, 2017.

The patent application "Audio Analysis Learning using Video Data" Ser. No. 15/861,855, filed Jan. 4, 2018 is also a continuation-in-part of U.S. patent application "Mental State Analysis Using Blink Rate for Vehicles" Ser. No. 15/670,791, filed Aug. 7, 2017, which claims the benefit of U.S. provisional patent applications "Image Analysis Framework using Remote Learning with Deployable Artifact" Ser. No. 62/439,928, filed Dec. 29, 2016, "Audio Analysis Learning using Video Data" Ser. No. 62/442,325, filed Jan. 4, 2017, "Vehicle Manipulation using Occupant Image Analysis" Ser. No. 62/448,448, filed Jan. 20, 2017, "Smart Toy Interaction using Image Analysis" Ser. No. 62/442,291, filed Jan. 4, 2017, "Image Analysis for Two-sided Data Hub" Ser. No. 62/469,591, filed Mar. 10, 2017, "Vehicle Artificial Intelligence Evaluation of Mental States" Ser. No. 62/503,485, filed May 9, 2017, and "Image Analysis for Emotional Metric Generation" Ser. No. 62/524,606, filed Jun. 25, 2017.

The patent application "Mental State Analysis Using Blink Rate for Vehicles" Ser. No. 15/670,791, filed Aug. 7, 2017 is also continuation-in-part of U.S. patent application "Mental State Analysis Using Blink Rate" Ser. No. 14/214,918, filed Mar. 15, 2014, which claims the benefit of U.S. provisional patent applications "Mental State Analysis Using Blink Rate" Ser. No. 61/789,038, filed Mar. 15, 2013, "Mental State Analysis Using Heart Rate Collection Based on Video Imagery" Ser. No. 61/793,761, filed Mar. 15, 2013, "Mental State Data Tagging for Data Collected from Multiple Sources" Ser. No. 61/790,461, filed Mar. 15, 2013, "Mental State Well Being Monitoring" Ser. No. 61/798,731, filed Mar. 15, 2013, "Personal Emotional Profile Generation" Ser. No. 61/844,478, filed Jul. 10, 2013, "Heart Rate Variability Evaluation for Mental State Analysis" Ser. No. 61/916,190, filed Dec. 14, 2013, "Mental State Analysis Using an Application Programming Interface" Ser. No. 61/924,252, filed Jan. 7, 2014, and "Mental State Analysis for Norm Generation" Ser. No. 61/927,481, filed Jan. 15, 2014.

The patent application "Mental State Analysis Using Blink Rate" Ser. No. 14/214,918, filed Mar. 15, 2014, is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352,166, filed Jun. 7, 2010, "Measuring Affective Data for Web-Enabled Applications" Ser. No. 61/388,002, filed Sep. 30, 2010, "Sharing Affect Data Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

The patent application "Mental State Analysis Using Blink Rate for Vehicles" Ser. No. 15/670,791, filed Aug. 7, 2017 is also a continuation-in-part of U.S. patent application "Computer Based Convolutional Processing for Image Analysis" Ser. No. 15/666,048, filed Aug. 1, 2017, which claims the benefit of U.S. provisional patent applications "Deep Convolutional Neural Network Analysis of Images for Mental States" Ser. No. 62/370,421, filed Aug. 3, 2016, "Image Analysis Framework using Remote Learning with Deployable Artifact" Ser. No. 62/439,928, filed Dec. 29, 2016, "Audio Analysis Learning using Video Data" Ser. No. 62/442,325, filed Jan. 4, 2017, "Vehicle Manipulation using Occupant Image Analysis" Ser. No. 62/448,448, filed Jan. 20, 2017, "Smart Toy Interaction using Image Analysis" Ser. No. 62/442,291, filed Jan. 4, 2017, "Image Analysis for Two-sided Data Hub" Ser. No. 62/469,591, filed Mar. 10, 2017, "Vehicle Artificial Intelligence Evaluation of Mental States" Ser. No. 62/503,485, filed May 9, 2017, and "Image Analysis for Emotional Metric Generation" Ser. No. 62/524,606, filed Jun. 25, 2017.

The patent application "Computer Based Convolutional Processing for Image Analysis" Ser. No. 15/666,048, filed Aug. 1, 2017 is also a continuation-in-part of U.S. patent application "Image Analysis using Sub-sectional Component Evaluation to Augment Classifier Usage" Ser. No. 15/395,750, filed Dec. 30, 2016, which claims the benefit of U.S. provisional patent applications "Image Analysis Using Sub-Sectional Component Evaluation to Augment Classifier Usage" Ser. No. 62/273,896, filed Dec. 31, 2015, "Analytics for Live Streaming Based on Image Analysis within a Shared Digital Environment" Ser. No. 62/301,558, filed Feb. 29, 2016, and "Deep Convolutional Neural Network Analysis of Images for Mental States" Ser. No. 62/370,421, filed Aug. 3, 2016.

The patent application "Image Analysis using Sub-sectional Component Evaluation to Augment Classifier Usage" Ser. No. 15/395,750, filed Dec. 30, 2016, is also a continuation-in-part of U.S. patent application "Mental State Event Signature Usage" Ser. No. 15/262,197, filed Sep. 12, 2016, which claims the benefit of U.S. provisional patent applications "Mental State Event Signature Usage" Ser. No. 62/217,872, filed Sep. 12, 2015, "Image Analysis In Support of Robotic Manipulation" Ser. No. 62/222,518, filed Sep. 23, 2015, "Analysis of Image Content with Associated Manipulation of Expression Presentation" Ser. No. 62/265,937, filed Dec. 10, 2015, "Image Analysis Using Sub-Sectional Component Evaluation To Augment Classifier Usage" Ser. No. 62/273,896, filed Dec. 31, 2015, "Analytics for Live Streaming Based on Image Analysis within a Shared Digital Environment" Ser. No. 62/301,558, filed Feb. 29, 2016, and "Deep Convolutional Neural Network Analysis of Images for Mental States" Ser. No. 62/370,421, filed Aug. 3, 2016.

The patent application "Mental State Event Signature Usage" Ser. No. 15/262,197, filed Sep. 12, 2016, is also a continuation-in-part of U.S. patent application "Mental State Event Definition Generation" Ser. No. 14/796,419, filed Jul. 10, 2015, which claims the benefit of U.S. provisional patent applications "Mental State Event Definition Generation" Ser. No. 62/023,800, filed Jul. 11, 2014, "Facial Tracking with Classifiers" Ser. No. 62/047,508, filed Sep. 8, 2014, "Semiconductor Based Mental State Analysis" Ser. No. 62/082,579, filed Nov. 20, 2014, and "Viewership Analysis Based On Facial Evaluation" Ser. No. 62/128,974, filed Mar. 5, 2015.

The patent application "Mental State Event Definition Generation" Ser. No. 14/796,419, filed Jul. 10, 2015 is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352,166, filed Jun. 7, 2010, "Measuring Affective Data for Web-Enabled Applications" Ser. No. 61/388,002, filed Sep. 30, 2010, "Sharing Affect Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

The patent application "Mental State Event Definition Generation" Ser. No. 14/796,419, filed Jul. 10, 2015 is also a continuation-in-part of U.S. patent application "Mental State Analysis Using an Application Programming Interface" Ser. No. 14/460,915, Aug. 15, 2014, which claims the benefit of U.S. provisional patent applications "Application Programming Interface for Mental State Analysis" Ser. No. 61/867,007, filed Aug. 16, 2013, "Mental State Analysis Using an Application Programming Interface" Ser. No. 61/924,252, filed Jan. 7, 2014, "Heart Rate Variability Evaluation for Mental State Analysis" Ser. No. 61/916,190, filed Dec. 14, 2013, "Mental State Analysis for Norm Generation" Ser. No. 61/927,481, filed Jan. 15, 2014, "Expression Analysis in Response to Mental State Express Request" Ser. No. 61/953,878, filed Mar. 16, 2014, "Background Analysis of Mental State Expressions" Ser. No. 61/972,314, filed Mar. 30, 2014, and "Mental State Event Definition Generation" Ser. No. 62/023,800, filed Jul. 11, 2014.

The patent application "Mental State Analysis Using an Application Programming Interface" Ser. No. 14/460,915, Aug. 15, 2014 is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352,166, filed Jun. 7, 2010, "Measuring Affective Data for Web-Enabled Applications" Ser. No. 61/388,002, filed Sep. 30, 2010, "Sharing Affect Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

This application is also a continuation-in-part of U.S. patent application "Background Analysis of Mental State Expressions" Ser. No. 14/672,328, filed Mar. 30, 2015, which claims the benefit of U.S. provisional patent applications "Background Analysis of Mental State Expressions" Ser. No. 61/972,314, filed Mar. 30, 2014, "Mental State Event Definition Generation" Ser. No. 62/023,800, filed Jul. 11, 2014, "Facial Tracking with Classifiers" Ser. No. 62/047,508, filed Sep. 8, 2014, "Semiconductor Based Mental State Analysis" Ser. No. 62/082,579, filed Nov. 20, 2014, and "Viewership Analysis Based On Facial Evaluation" Ser. No. 62/128,974, filed Mar. 5, 2015.

The patent application "Background Analysis of Mental State Expressions" Ser. No. 14/672,328, filed Mar. 30, 2015 is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352,166, filed Jun. 7, 2010, "Measuring Affective Data for Web-Enabled Applications" Ser. No. 61/388,002, filed Sep. 30, 2010, "Sharing Affect Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

The patent application "Background Analysis of Mental State Expressions" Ser. No. 14/672,328, filed Mar. 30, 2015 is also a continuation-in-part of U.S. patent application "Mental State Analysis Using an Application Programming Interface" Ser. No. 14/460,915, Aug. 15, 2014, which claims the benefit of U.S. provisional patent applications "Application Programming Interface for Mental State Analysis" Ser. No. 61/867,007, filed Aug. 16, 2013, "Mental State Analysis Using an Application Programming Interface" Ser. No. 61/924,252, filed Jan. 7, 2014, "Heart Rate Variability Evaluation for Mental State Analysis" Ser. No. 61/916,190, filed Dec. 14, 2013, "Mental State Analysis for Norm Generation" Ser. No. 61/927,481, filed Jan. 15, 2014, "Expression Analysis in Response to Mental State Express Request" Ser. No. 61/953,878, filed Mar. 16, 2014, "Background Analysis of Mental State Expressions" Ser. No.

61/972,314, filed Mar. 30, 2014, and "Mental State Event Definition Generation" Ser. No. 62/023,800, filed Jul. 11, 2014.

Each of the foregoing applications is hereby incorporated by reference in its entirety.

FIELD OF ART

This application relates generally to analysis using multiple devices and more particularly to multidevice multimodal emotion services monitoring.

BACKGROUND

An individual's cognitive state is often reflected by that person's facial expressions. For example, feelings of happiness often result in smiles, and feelings of frustration often result in frowns. The use of the term "facial expressions" refers to movements of the musculature of the face. Various muscles control the movement of the face, scalp, and outer ear, enabling a wide variety of facial expressions. The upper eyelid also plays a role in various facial expressions, such as expressions of surprise, fear, and anger. The expression evidenced by an individual in response to a particular cognitive state is referred to as emotional signaling. For example, an individual might express anger by furrowing his or her brow and tightening his or her lips while also displaying teeth, a set of actions which, when considered together, are part of an attack response. Similarly, a user might also express disgust with an open mouth, a nose wrinkle, and a tongue protrusion as part of a vomiting response. In addition, facial expressions can be part of expressive regulation, where the use of the facial muscles serves to regulate emotional signals being output by an individual. Facial expressions can also be a sign of cognition; the expressions can indicate that an individual is experiencing a state of concentration, recollection, or confusion, among others.

On any given day, an individual is confronted with a dizzying array of external stimuli. The stimuli can be any combination of visual, aural, tactile, and other types of stimuli, and, whether alone or in combination, can invoke strong emotions in the individual. An individual's reactions to received stimuli provide glimpses into the fundamental identity of the individual. Further, the individual's responses to the stimuli can have a profound impact on the cognitive states that person experiences. The cognitive states of an individual can vary widely, ranging from happiness to sadness, from contentedness to worry, and from calm to excitement, to name only a very few possible states.

An individual's cognitive, mental, or emotional state can also determine how the individual interprets external stimuli. For example, studies have been conducted showing that people find a given cartoon more humorous when watching the cartoon with an intentional smile as opposed to an intentional frown. That is, an expression of an emotional state, even if the expression is forced or contrived, can impact how a particular external event is perceived. Further, other studies have been performed suggesting that briefly forced smiling during periods of stress can help reduce a person's physical stress response, regardless of whether or not the person actually feels happy.

Thus, a complex relationship exists between physical and cognitive states. Additionally, how an experience is perceived can depend at least in part on the cognitive state of an individual at the time of the experience. For example, common experiences such as watching movies and television shows, dining at restaurants, playing games, taking classes, and performing work-related activities can all be perceived differently depending on the cognitive state of the individual. How an individual handles unforeseen or unexpected circumstances such as a traffic jam, a delayed flight, or a surprise visitor is also impacted by the individual's current mental/emotional state. As already noted, an individual might be able to influence their own cognitive state by forcing certain physiological actions, such as smiling. Therefore, cognitive state analysis has a wide range of applications in medical, psychological, and commercial environments.

SUMMARY

Multidevice, multimodal emotion services monitoring is disclosed. An expression to be detected is determined. The expression relates to a cognitive state of an individual. Input pertaining to the cognitive state of the individual is obtained using a device local to the individual. Monitoring for the expression is performed. The monitoring uses a background process on a device remote from the individual. An occurrence of the expression is identified. The identification is performed by the background process. Notification that the expression was identified is provided. The notification is provided from the background process to a device distinct from the device running the background process. The expression is defined as a multimodal expression. The multimodal expression includes image data and audio data from the individual. The notification enables emotion services to be provided. The emotion services augment messaging, social media, and automated help applications.

A computer-implemented method for multi-device analysis is disclosed comprising: determining an expression to be detected, wherein the expression relates to a cognitive state of an individual; obtaining input on the cognitive state of the individual using a first device local to the individual; monitoring for the expression, using a background process on a second device remote from the individual; identifying an occurrence of the expression, by the background process; and providing notification that the expression was identified, wherein the notification is provided from the background process to a third device, wherein the third device is distinct from the second device. In embodiments, the expression is defined as a multimodal expression. In embodiments, the multimodal expression includes image data and audio data from the individual. In embodiments, the notification enables emotion services to be provided. And in embodiments, the emotion services augment messaging, social media, and automated help applications.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
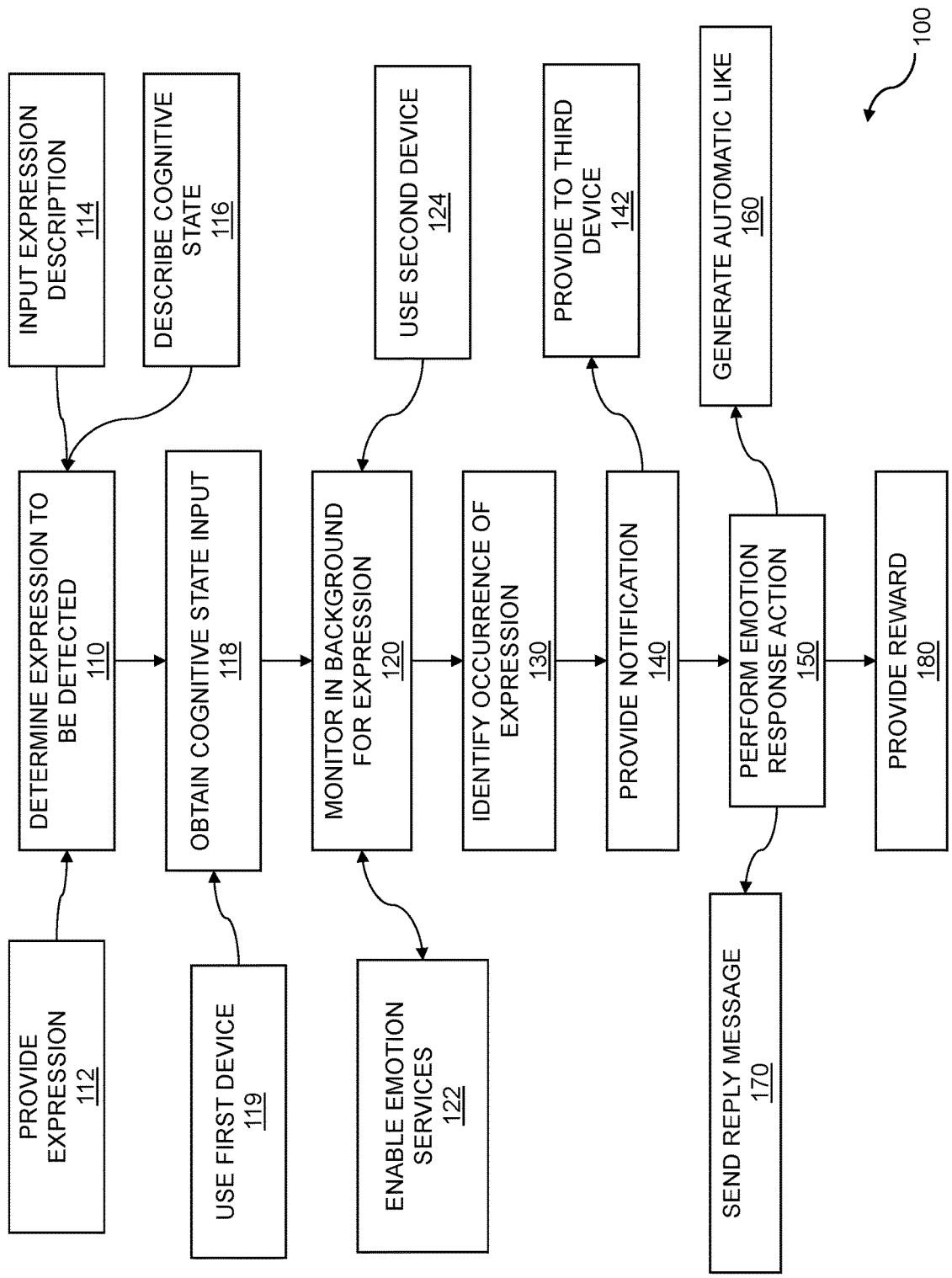
FIG. 1 is a flow diagram for multidevice, multimodal emotion services monitoring.

On any given day, people can experience a range of cognitive states as they sense and react to external stimuli. The external stimuli can be experienced through the primary senses, including sight, smell, touch, hearing, and taste, as well as through other senses including balance, temperature, pain, and so on. The external stimuli can be naturally generated and can be experienced as the people interact with the world around them. Examples of naturally generated external stimuli can include, for example, the view of a beautiful panorama from a mountain peak, a sunset on a deserted beach, the sighting of a rare bird or animal, and so on. The external stimuli can also be human-generated. Examples of human-generated external stimuli can include pieces or installations of artwork, sports events, and various media such as movies, videos, television, advertisements, and so on. Regardless of whether a source of external stimuli is naturally occurring or human-generated, people can be monitored and data can be collected regarding the people's reactions to the external stimulus or stimuli. In turn, the data gathered from the people can be analyzed to determine one or more cognitive states. The data gathered from the people can include visual cues such as facial expressions, posture, and so on, and can also include physiological data such as heart rate. Based on the people's determined cognitive states, the effectiveness of a media presentation or another stimulus can be evaluated and compared to the effectiveness of other media presentations, for example. Media comparisons and evaluations can be used to improve the effectiveness of a given media presentation and the ability of the media presentation to influence the people viewing it. That is, a media presentation can have positive effects on the people viewing it. As previously mentioned, studies suggest that the physical act of smiling improves a person's mood. Given this, a person who reacts to the viewing of a media presentation with a smile can experience the positive effect of smiling, such as an overall improvement in mood.

The cognitive states experienced by people exposed to various stimuli can range widely and can include sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, and curiosity, for example. The cognitive states can be determined by gathering various data from the people as they experience the stimuli. For example, cognitive states can be determined by examining the people for visual cues such as eyebrow raises or eyebrow furrows, smiles or frowns, etc. The cognitive states can also be determined by monitoring physiological data such as heart rate, heart rate variability, skin temperature, electrodermal conductance, and so on. The cognitive states of the people can be analyzed using a range of devices including mobile devices, smart phones, tablet computers, laptop computers, desktop computers, and so on. Increasingly, other devices can also be used to determine cognitive states. The additional devices can include "intelligent" devices such as smart televisions, Internet-connected devices found in a smart home, and so on.

Cognitive state analysis can be used to determine the one or more cognitive states of a person as he or she performs various tasks. The person's cognitive state can be analyzed for a variety of purposes. For example, a person might be asked to comply with a request for the express purpose of monitoring the cognitive state or states of the person. In another example, the person can be offered an incentive for complying with the request. The person might be using an application that has been registered for emotion services. The application can register with a background process to receive notifications when a particular cognitive state expression is invoked by the user. The cognitive state expression can include one or more of a smile, a frown, an eyebrow raise, an eyebrow furrow, and so on. Such cognitive state analysis can be used to gauge the response of the person to the request. Based on the response of the person to the request, that is, the level of correspondence between the individual's cognitive state expression and the parameters stipulated by the request, the person can be rewarded for the effectiveness of his or her cognitive state expression. In other embodiments, a person uses a messaging application, such as an email or text message application, to read a message from a friend that makes him smile. The messaging application, having been registered for emotion services, receives notification of the user evidencing a happy cognitive state shortly after the user accesses the message, and thus sends a reply message to the sender indicating that the recipient was happy upon reading the message. In certain embodiments, the response message also includes an image of how the user looked upon reading the message. To facilitate the identification of cognitive states, cameras on devices can track eye movements to make an estimation and/or determination of when the message has been read.

The cognitive state analysis that can be used to determine the one or more cognitive states of a person can be based on passive, as well as active, monitoring of the person. Various devices can be used for the monitoring, including mobile devices, smart phones, PDAs, tablet computers, laptop computers, desktop computers, and so on. The devices that can be used for the monitoring can also include "intelligent" devices such as smart televisions, Internet-connected devices, wireless digital consumer devices, and so on. The devices can be executing a variety of tasks simultaneously or independently, including foreground tasks and background tasks. The foreground tasks can include applications and apps such as front office software, research and academic software, and so on. The foreground tasks can also include entertainment applications such as video and music streaming, games, and so on. The background tasks can include operating systems, updates to calendars and software, and so on. The background tasks can also include monitoring applications. Foreground tasks and background tasks can be operating simultaneously. So, for example, a person can be viewing a video using a foreground task while a monitoring task is operating in the background. The devices can use the monitoring tasks operating in the background to monitor the person for cognitive state expressions while the person is viewing the video or performing another action, for example. The monitoring devices can gather data from the person. The data that can be gathered can include video data, audio data, temperature data, and so on. In embodiments, a background process monitors the cognitive state of a user. One or more foreground applications that wish to take advantage of emotion services can register for notifications from the background process. In turn, the background process continuously or periodically monitors the expressions and/or gestures of the user. When the user invokes a predetermined cognitive state (e.g. confusion), a notification can be sent to a foreground application, which can then perform an emotion response action. The emotion response action depends on the type and purpose of the foreground application, and can include, but is not limited to, sending a reply message, providing a reward, and/or generating an automatic "like" on a social media system.

FIG. 1 is a flow diagram 100 for is a flow diagram for multidevice, multimodal emotion services monitoring. The flow starts with determining an expression to be detected 110. The expression can include, but is not limited to, joy, happiness, confusion, anger, frustration, boredom, and/or sadness. The expression to be detected can depend on an application performing the requesting. For example, an automated help application can invoke an automated help system upon detection of an expression of confusion. An expression of the type to be detected can be provided 112. That is, in embodiments, the determining is accomplished at least in part by the providing an expression to the system for matching purposes. The providing an expression can be accomplished via an image. For example, a user or system administrator can upload pictures and/or illustrations of the types of expressions the application should detect. Alternatively, an expression description is input 114 and/or a cognitive state is described 116 in order to specify the expression or expressions to be detected. Thus, in some embodiments, the determining is accomplished by describing a cognitive state. A user can select, via a user interface, one or more expressions that are to be detected. For example, a user might select confusion and frustration as the expressions to be detected for an embodiment where an automated help application is triggered when a user experiences confusion and frustration. Furthermore, in some embodiments, the determining is accomplished by inputting an expression description. In some embodiments, the inputting of the expression description 114 includes specifying one or more facial action coding system (FACS) codes. The codes can include one or more action units (AUs) in order to specify particular aspects of a facial expression that is to be detected. In other embodiments, images can be provided. In yet other embodiments, an audio expression or tone of voice can be provided such that both image and/or audio expressions are included in providing multimodal emotion services.

The flow continues with obtaining cognitive state input 118. The cognitive state input can be obtained using a first device 119. The first device can be a generally-fixed device, such as a desktop computer, or a handheld device, such as a smart phone, that is owned and/or operated by an individual, or a standalone device, such as a room-monitoring camera. The cognitive state input can be obtained using an imaging device, such as a camera, that is built into the first device. Other image sensing devices can be contemplated. In some embodiments, the imaging device is separate from, but connected to, the first device, such as standalone camera using a wired or wireless connection to the first device. The wired or wireless connection can be directly to the first device, or it can be routed through other intervening devices. The cognitive state input can include audio input. The audio input can be obtained using a microphone, for example, that is built into the first device. As with image data obtained as cognitive state input, the audio data obtained as cognitive state input can be obtained through any number of diverse configurations. In embodiments, only the audio input is obtained.

The flow continues with monitoring in the background for an expression 120. The monitoring can be performed on a second device 124, such as a server or cloud computer. The second device can be distinct from the first device, such that the monitoring is performed in a process on hardware that is distinct from that used for obtaining the cognitive state input. The monitoring can be performed with a background application, one or more processes within an application, one or more threads within an application, and/or a dedicated processor or processors. While various embodiments are possible for implementing the background monitoring, hereinafter the entity performing the monitoring will be referred to as a "background process." The background process can have access to one or more camera sensors. In embodiments, a camera sensor is continuously active as part of the monitoring. The background process can be started by enabling emotion services 122. In embodiments, the emotion services are provided on a device. The device can include, but is not limited to, a computer, mobile phone, and/or tablet computer. Embodiments include enabling emotion services using the one or more devices. The emotion services can include detecting smiles, expressions, frowns, heart rate, eyebrow raises, brow furrows, concentration, expressiveness, and laughter. In embodiments, applications use the enabling. Applications can include, but are not limited to, messaging applications, social media applications, and online help applications. In embodiments, the emotion services are requested by the individual. In embodiments, the emotion services are requested by a third party, which is neither the individual nor the provider of the emotion services.

The flow continues with identification of an occurrence of the specified expression or expressions 130. In embodiments, the identifying is provided with a confidence interval. For example, an expression of confusion can be identified by positions of eyebrows, lip corners, and brows. If a user invokes a facial expression with all three of these facial components in the confused pattern, then the confidence interval can be determined to be high (e.g. 90 percent range). If the user instead invokes a facial expression where the brow and eyebrows indicate confusion, but the lip corners do not, then the confidence interval might be lower (e.g. 70 percent range). In embodiments, the expression is a reflection of a cognitive state. The flow continues with providing notification 140. In embodiments, a foreground application receives the providing of the notification. The notification can be provided to one or more foreground applications. In embodiments, a subscriber callback mechanism can be used. In some embodiments, the applications call an application programming interface (API) to specify a desired expression and to register a callback function with the background process. The background process maintains a list of expressions and callback functions. When a given expression is detected, each registered callback function is executed to provide notification to the respective foreground applications. In other embodiments, remote procedure calls can be used to provide notification. In embodiments, the confidence interval is reported in the notification. In this way, the foreground application can use the confidence interval in deciding what course of action to take based on the notification. For example, an application might invoke an automatic help dialog box if a user appears confused and the user's expression of confusion exceeds a given confidence interval, but would ignore the user's expression of confusion if it falls below the determined confidence interval. In embodiments, the expression is identified in whole or in part by analyzing audio input. The notification can be provided to a third device 142. In embodiments, the third device and the first device are the same device.

The flow continues with performing an emotion response action 150. The response action 150 can include, but is not limited to, sending a reply message 170 to a sender. In one embodiment, the reply message shows the sender an emotion that the recipient experienced upon reading the sender's message. In another embodiment, the response action includes generating an automatic like 160. A like-generating embodiment can be ideal for social media systems where participants can "like" content on the social media system. In a social media context, a "like" is an indication of favorability that can be recorded in the social media system. The social media system might keep track of likes received by, as well as who has liked, a particular piece of content. In a typical social media system, a user clicks a button or icon on the social media user interface in order to provide a like. In embodiments, the generating of an automatic like includes detecting a positive emotion while a user views a piece of social media content and attributing a like to the content on the user's behalf. In yet other embodiments, the providing includes delivering a coupon or a reward 180. The reward can include a coupon, virtual currency, currency, or another suitable gift. In embodiments, the providing is part of a gaming experience. For example, while playing an online multiplayer battle game, a user might earn a reward for providing a "fierce battle" expression. Embodiments can include one or more of sending a reply message, generating an automatic like, or providing a reward, as part of the emotion response action. Other emotion response actions are possible, including, but not limited to, adjusting lights in a room, adjusting room temperature, and adjusting music genre and/or music volume in a room, in response to detecting a particular emotion. Thus, in embodiments, a foreground application receives the providing of the notification, thereby enabling emotion services using the two or more devices and opening the possibility of performing an emotion response action in response to the provided notification. Various steps in the flow 100 may be changed in order, repeated, omitted, or the like without departing from the disclosed concepts. Various embodiments of the flow 100 may be included in a computer program product embodied in a non-transitory computer readable medium that includes code executable by one or more processors.

Figure 2:
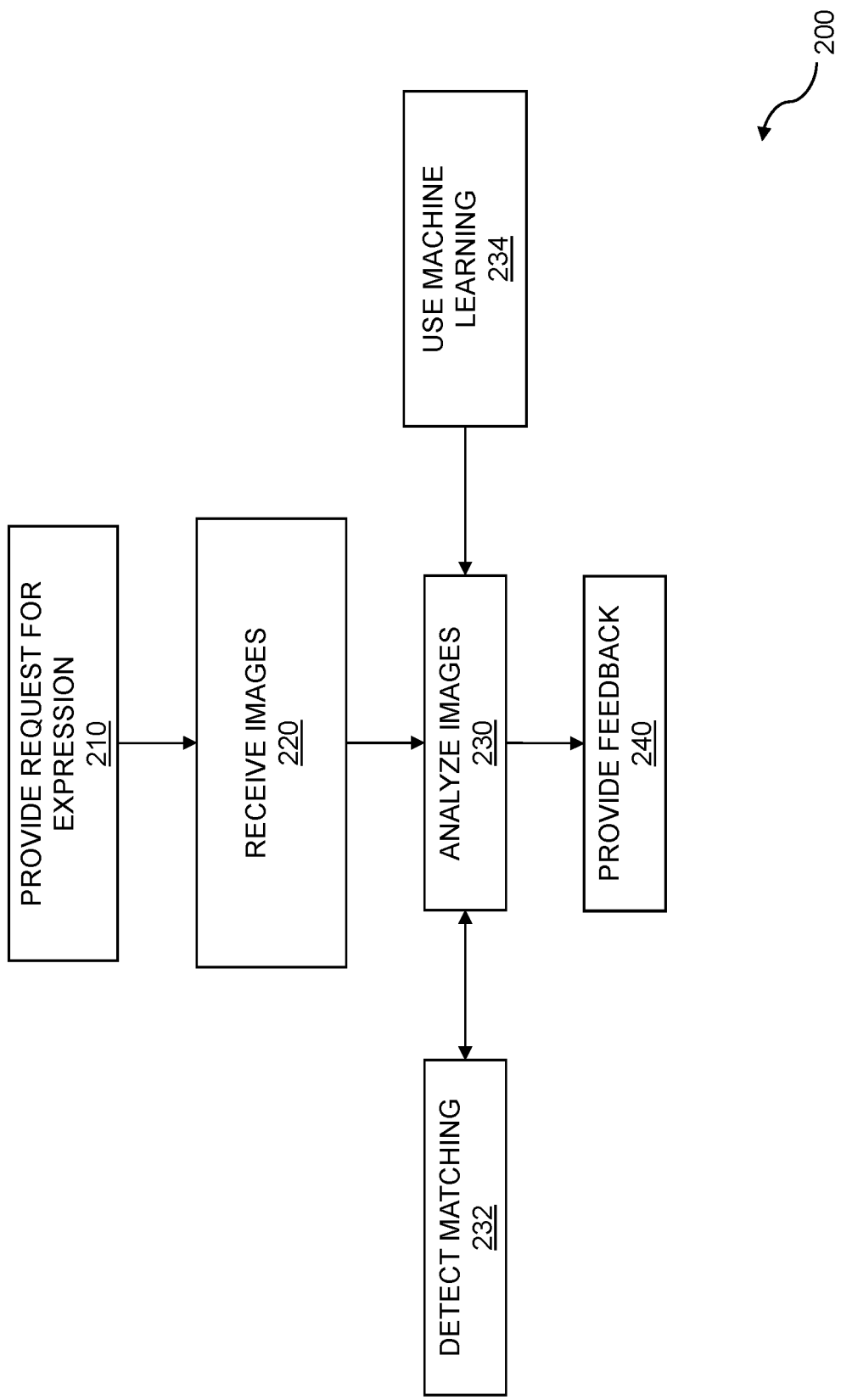
FIG. 2 is a flow diagram for expression analysis.

FIG. 2 is a flow diagram for expression analysis. The flow 200 describes a computer-implemented method for analysis using multiple devices comprising providing a request to a user for a certain expression 210, receiving one or more images 220 from the user in response to the request, analyzing the images 230 to detect matching 232 between the request and the response, and providing feedback 240 based on the analyzing. The request can be a function of a cognitive state. The cognitive state can be one or more of frustration, confusion, disappointment, hesitation, cognitive overload, focusing, engagement, exploration, confidence, trust, delight, disgust, skepticism, doubt, satisfaction, excitement, laughter, calmness, sadness, stress, anger, happiness, and curiosity. The feedback can include a reward. The reward can include a coupon. The coupon can include a digital coupon. The reward can include currency. The currency can include a virtual currency. In embodiments, the analyzing the images 230 can be performed using machine learning 234. Various implementations of machine learning are possible, such as neural network machine learning, convolutional neural network machine learning, deep learning, etc. Various steps in the flow 200 may be changed in order, repeated, omitted, or the like without departing from the disclosed concepts. Various embodiments of the flow 200 may be included in a computer program product embodied in a non-transitory computer readable medium that includes code executable by one or more processors.

Figure 3:
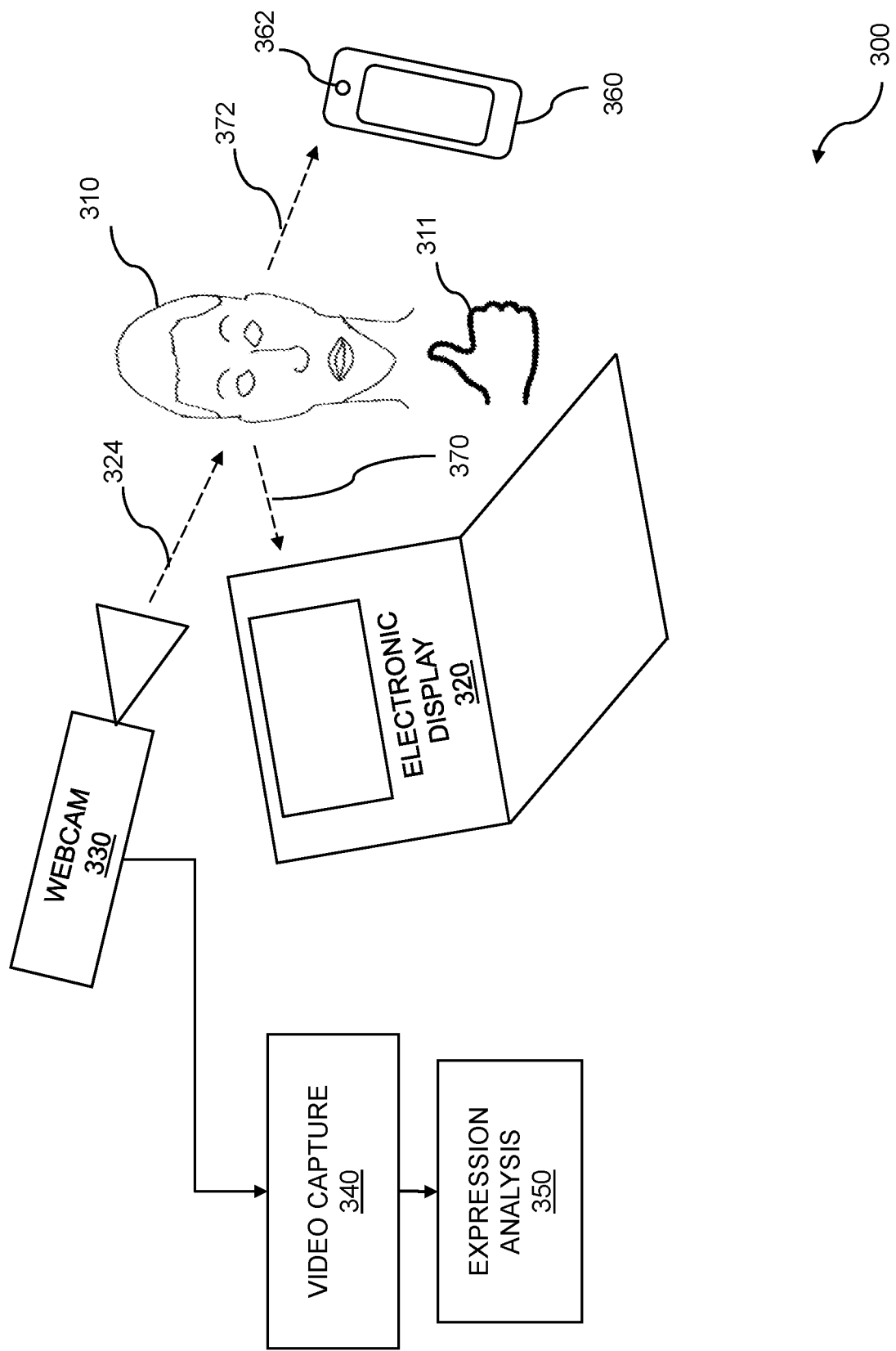
FIG. 3 shows an image collection system for facial analysis.

FIG. 3 shows an image collection system for facial analysis 300. An individual 310 can view on a line of sight 370 an electronic display 320, and cognitive state data pertaining to the individual 310 can be collected and analyzed. The electronic display 320 can show an output of a computer application that the individual 310 is using, or the electronic display 320 can show a media presentation so that the individual 310 is able to view the media presentation. The display 320 can be any electronic display, including but not limited to, a computer display, a laptop screen, a netbook screen, a tablet screen, a cell phone display, a mobile device display, a remote with a display, a television, a projector, or the like. Likewise, other electronic displays such as a mobile device 360 showing the media presentation or another presentation can be viewed by the individual 310 on another line of sight 372. While viewing the media presentation, the individual 310 can be monitored by a camera 330 on another line of sight 324. The media presentation can include one of a group consisting of a movie, a television show, a web series, a webisode, a video, a video clip, an electronic game, an e-book, or an e-magazine. The electronic display 320 can be a part of, or can be driven by, the device collecting the cognitive state data, or the electronic display might only be loosely coupled with, or may even be unrelated to, the device collecting the cognitive state data, depending on the embodiment. The collecting can be accomplished with a mobile device 360 such as a cell phone, a tablet computer, or a laptop computer, and the mobile device can include a front-side camera 362. Facial data on the individual 310 can be collected with a camera such as the front-side camera 362 of the mobile device 360 and the webcam 330.

Additionally, the individual 310 can make one or more gestures 311 as part of answering the request for generating an emotional response. The webcam 330 can be configured to acquire images of the gesture 311 and the gesture 311 can be analyzed as part of the expression analysis 350. Vision-based gestural analysis can utilize recognition of static hand gestures or body postures. The imaging techniques used in the analysis can include, but are not limited to, identification of contours and silhouettes, and/or generation of 3D hand skeleton models. In various embodiments, the 3D hand models utilize non-uniform rational basis spline (NURBS) or polygon meshes. Embodiments can also utilize simple 3D geometric structures to model the human body. Structures like generalized cylinders and super-quadrics, which encompass cylinders, spheres, ellipsoids and hyper-rectangles, can be used to approximate the shape of simple body parts, such as fingers, a thumb, a forearm, and/or the upper arm portions of limbs. In embodiments, the gestures are identified utilizing a DTW (dynamic time warping) pattern recognizer and/or a Hidden Markov Model (HMM) recognizer.

The video can be obtained using a webcam 330. The video can be obtained from multiple sources, and in some embodiments, at least one of the multiple sources is a mobile device. The expression information can be collected intermittently when the individual 310 is looking in the direction of a camera, such as the front-side mobile camera 362 or the webcam 330. The camera can also capture images of the setting in which a user is found, images which can be used in determining contextual information.

The webcam 330 can capture video, audio, and/or still images of the individual 310. A webcam, as the term is used herein, can include a video camera, a still camera, a thermal imager, a CCD device, a phone camera, a three-dimensional camera, a depth camera, multiple webcams used to show different views of a person, or any other type of image capture apparatus that can allow captured data to be used in an electronic system. The images of the individual 310 from the webcam 330 can be processed by a video capture unit 340. In some embodiments, video is captured, while in other embodiments, one or more still images are captured by the unit 340. The system 300 can include analyzing the video for expressions 350, facial data, and/or physiological data. The facial data can include information on facial expressions, action units, head gestures, smiles, smirks, brow furrows, squints, lowered eyebrows, raised eyebrows, or attention, in various embodiments. Analysis of physiological data can also be performed based on the video. Respiration, heart rate, heart rate variability, perspiration, temperature, and other physiological indicators of cognitive state can be determined by analyzing the video.

Figure 4:
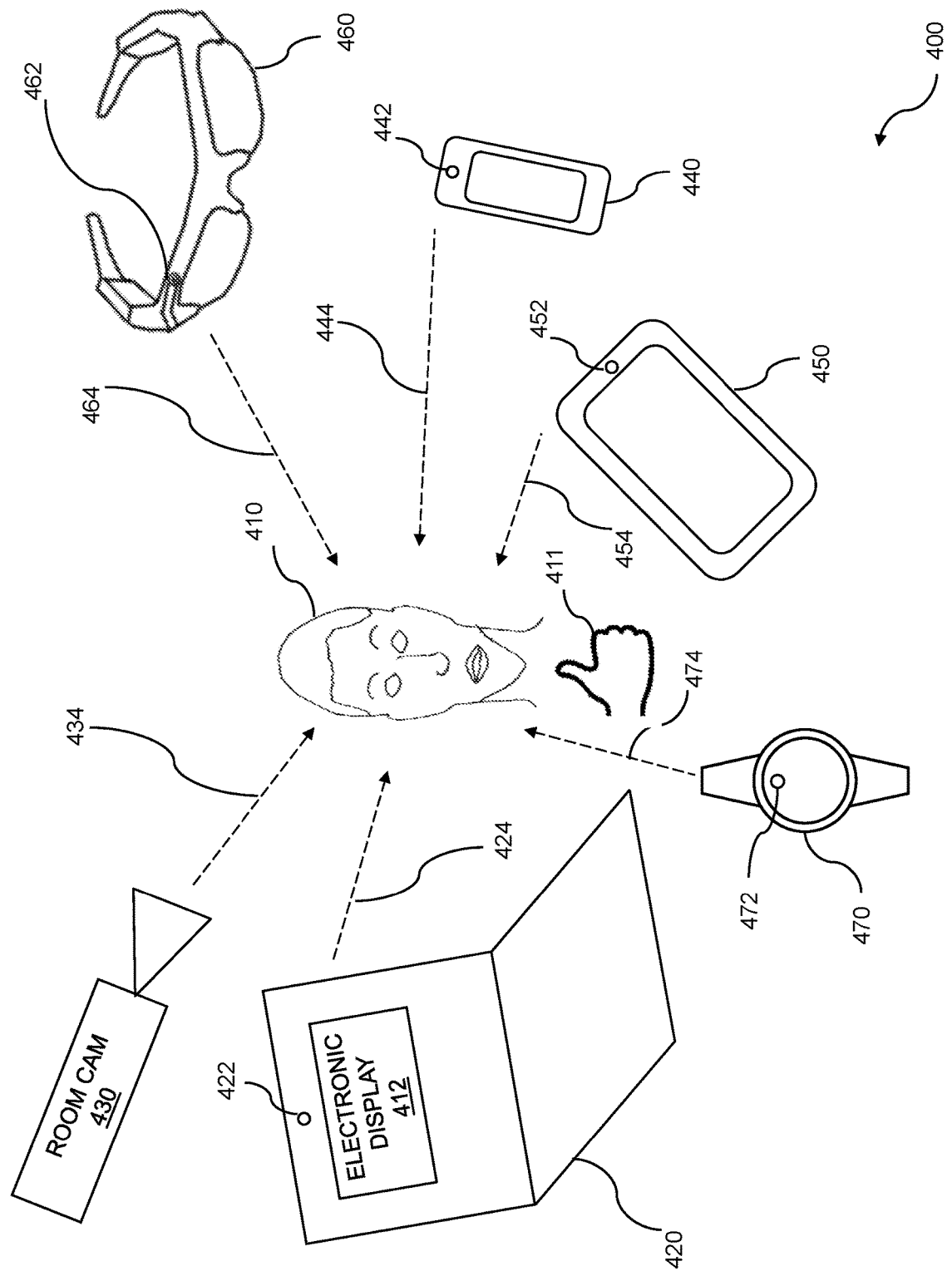
FIG. 4 shows example cognitive state data capture from multiple devices.

FIG. 4 shows a diagram 400 illustrating example cognitive state data capture from multiple devices. Expressions can be determined based on cognitive state data collected from multiple devices and, additionally, the cognitive state data can be obtained from multiple sources. At least one of the multiple sources can be a mobile device. Thus, facial data can be collected from a plurality of sources and used for cognitive state analysis. A user 410 can be performing a task, viewing a media presentation on an electronic display 412, or doing any activity where it can prove useful to determine the user's cognitive state. The electronic display 412 can be on a laptop computer 420 as shown, a tablet computer 450, a mobile phone 440, a desktop computer monitor, a television, or any other type of electronic device. One or more of the devices shown in the diagram 400, such as the tablet computer 450, the phone 440, and/or the laptop computer 420 can execute a background process for background analysis of cognitive state expressions. In embodiments, the monitoring comprises a background operation within the one or more devices. In embodiments, the monitoring is accomplished passively. That is, there are no special actions required by the user, or special requests given to the user to collect cognitive state data. In such embodiments, the one or more devices can monitor the user using camera sensors, microphones, and/or other types of sensors as he or she goes about performing an activity (e.g. using a particular foreground application).

The cognitive state data can be collected on a mobile device such as the mobile phone 440, the tablet computer 450, or the laptop computer 420; a fixed device, such as a room camera 430; or a wearable device such as glasses 460 or a watch 470. In various embodiments, the glasses 460 are virtual reality glasses or augmented reality glasses. Virtual reality glasses can render a scene to elicit a cognitive state from the user 410. The plurality of sources can include at least one mobile device such as the mobile phone 440 or the tablet computer 450, or a wearable device such as the glasses 460 or the watch 470. A mobile device can include a front-side camera and/or back-side camera, both of which can be used to collect video and/or image data. In embodiments, the room camera 430 comprises a video capture device for capturing multiple images in rapid succession and includes a depth sensor to provide 3D motion capture. In embodiments, the depth sensor comprises an infrared laser projector. In embodiments, the room camera 430 also provides gesture recognition capabilities.

As the user 410 is monitored, the user 410 can move due to the nature of the task, boredom, distractions, or for another reason. As the user moves, the user's face can be visible from one or more of the multiple sources. For example, if the user 410 is looking in a first direction, the user's face might be within the line of sight 424 of the webcam 422, but if the user is looking in a second direction, the user's face might be within the line of sight 434 of the room camera 430. Further, if the user is looking in a third direction, the user's face might be within the line of sight 444 of the phone camera 442, and if the user is looking in a fourth direction, the user's face might be within the line of sight 454 of the tablet camera 452. Continuing, if the user is looking in a fifth direction, the user's face might be within the line of sight 464 of the wearable camera 462, and if the user is looking in a sixth direction, the user's face might be within the line of sight 474 of the other wearable camera 472. Another user or an observer can wear the wearable device, such as the glasses 460 or the watch 470. In other embodiments, the wearable device is a device other than glasses, such as an earpiece with a camera, a helmet or hat with a camera, a clip-on camera attached to clothing, or any other type of wearable device with a camera or another sensor for collecting cognitive state data. The user 410 can also wear a wearable device including a camera which can be used for gathering contextual information and/or collecting cognitive state data on other users. Because the user 410 can move his or her head, the facial data can be collected intermittently when the user 410 is looking in the direction of a camera. In some cases, multiple people are included in the view from one or more cameras, and some embodiments include filtering out faces of one or more other people to determine whether the user 410 is looking toward a camera. An expression can thus be identified using cognitive state data collected by various devices. Expressions can be analyzed from the various devices collectively on cognitive state data combined from multiple devices. The devices are shown for illustration purposes only, and other devices, such as a smart refrigerator, can be used as well. Additionally, the individual 410 can make one or more gestures 411 as part of answering the request for generating an emotional response. The camera 430 can be configured to acquire images of the gestures 411 and the gestures 411 can be analyzed as part of the expression analysis.

Figure 5:
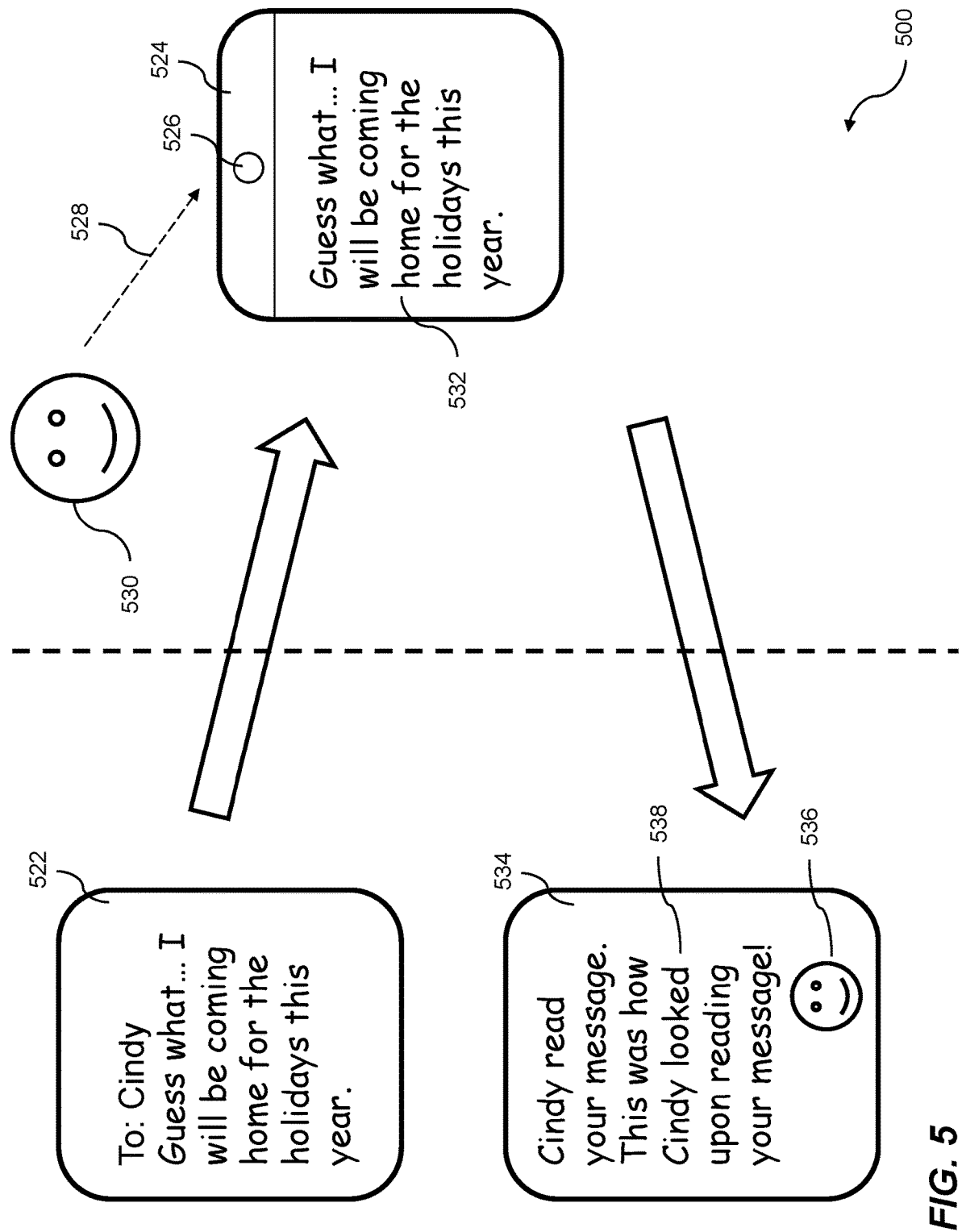
FIG. 5 shows an embodiment using a messaging application.

FIG. 5 shows an embodiment 500 using a messaging application. In a messaging embodiment, a background process monitors the emotional state of a user as the user reads messages. Upon detecting a particular emotional state in the user, the background process can generate a reply message to be sent to the sender, indicating that the recipient experienced a particular cognitive state upon reading the message. Additionally, the reply message can also include an image showing the recipient's reaction upon reading the message. The reply message can also include text indicating that the recipient read the message, and can further include text conveying the detected emotion. As shown in FIG. 5, a sender sends a message 522 to a recipient 530. The message can include, but is not limited to, an email message, an SMS text message, an instant message, a chat, a social media post, or another electronic message type. In embodiments, the recipient 530 reads the received message 532 on his or her device 524, which includes a camera 526 that has a line of sight 528 to the recipient 530. Upon detecting a particular emotion such as joy, the background process can notify the messaging application (which is a foreground process), and the messaging application can then send a reply message 534 to the sender. In embodiments, the reply message 534 includes a text portion 538, and an image portion 536, the image portion comprising an image captured by the recipient's camera 526 upon detecting the desired emotion. In this way, users of the messaging system experience more deeply the emotions inherent in human communication by seeing the candid, instantaneous response of a recipient reading an electronic message. Note that while the embodiment described herein illustrates an automatic sending of a reply message with emotional state information of the recipient included, other embodiments ask the recipient if they wish to send the information. For example, if the background process detects a laugh while the user is reading a message, the recipient can be prompted with a message such as, "Something seems funny . . . . Do you wish to share it with the sender?" Such an embodiment can promote a more fulfilling and entertaining messaging experience. Thus, in embodiments, the foreground application comprises a messaging application configured to send messages between a sender and a recipient, and, upon the recipient accessing a first message, the background process identifies an occurrence of the identified expression. Further, upon identifying an occurrence of the expression, the background process can instigate an emotion response action comprising, in embodiments, sending a second message to the sender including emotion scoring, wherein the second message is indicative of the recipient's emotional response to the first message. The second message can further include an image and/or an emoji. The emoji can include an emoticon or in some other way can include a digital representation of a mood, emotion, or cognitive state.

In addition to messaging applications, embodiments also pertain to social media applications. For example, in a social media system, users can post various messages (also referred to as "posts") to the system, which can be rendered on a website, within an application, or in another electronic format. As a user accesses (reads) the social media messages (posts), the background process on the user's device can monitor emotional states. In some embodiments, the foreground social media application on the user's device receives the emotional state notification from the background process, and, in response, posts a social media message indicating the user's emotional state. Thus, in embodiments, the foreground application comprises a social media application configured to display a first message, and, upon the recipient accessing the first message, allows a background process to determine an occurrence of the identified expression and perform an emotional response action. The emotion response action can include posting a second message which comprises emotion scoring on a social media system, and wherein the second message is indicative of the recipient's emotional response to the first message. In other embodiments, the social media system can generate an automatic "like" of the post if a positive emotional state (e.g. laughter or joy) is detected. The second message can further include an image and/or an emoji. Thus, disclosed embodiments can enhance the social media experience. To summarize, embodiments include a foreground social media application configured to display a message to a user, simultaneously allow a background process to determine an occurrence of a previously identified expression in the user, and generate an emotion response action, such as an automatic like of the message, in response to the expression.

Figure 6:
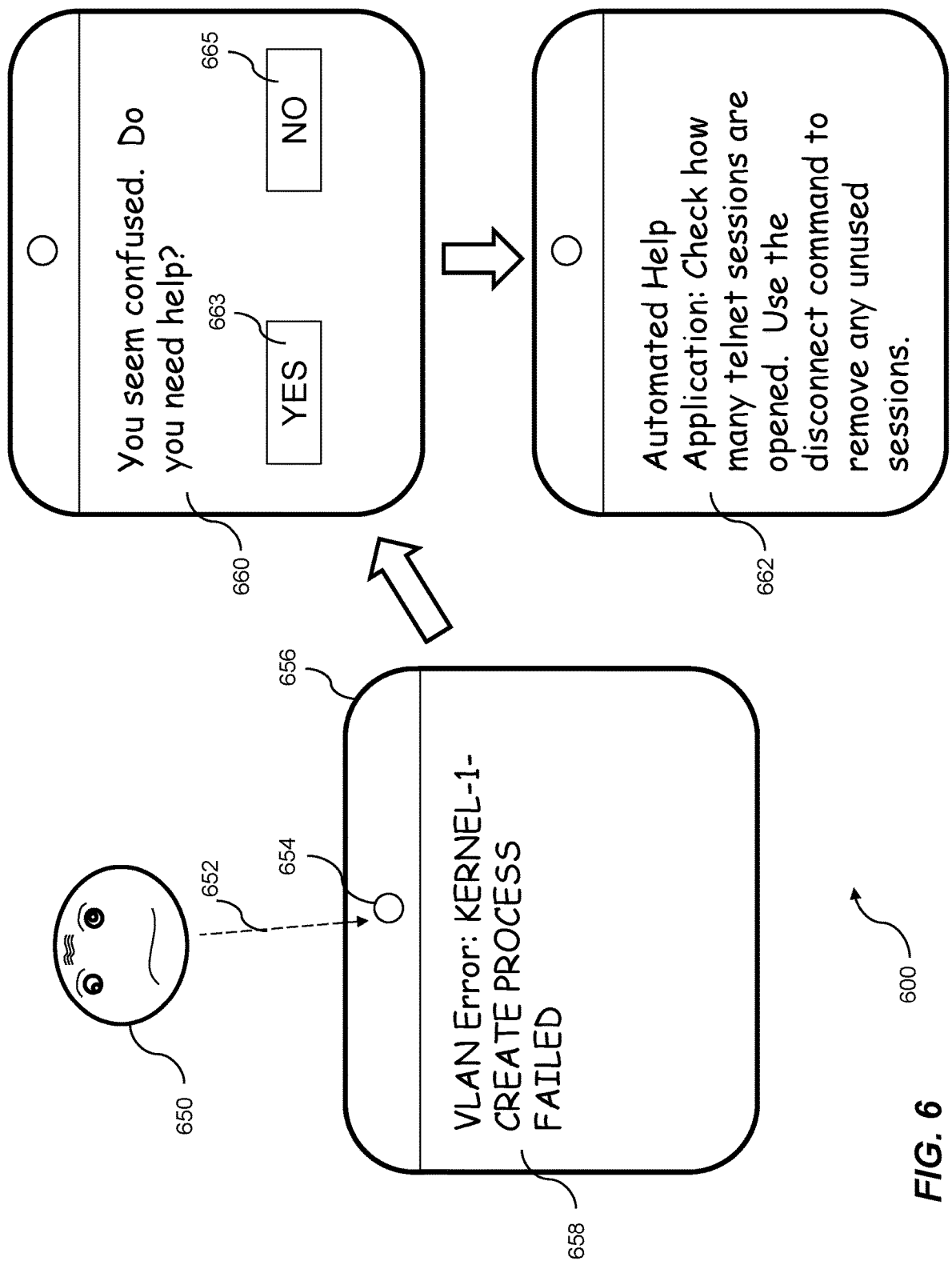
FIG. 6 shows an embodiment using an automated help application.

FIG. 6 shows an embodiment 600 using an automated help application. A user 650 is interacting with a foreground application on his or her device 656. The user 650 is within a line of sight 652 of a camera 654. A background process periodically monitors the emotional state of the user 650. If the user 650 receives feedback 658 from the foreground application with which he or she is interacting, that causes an expression of confusion, and the background process then can notify the foreground application that the user 650 is currently experiencing confusion. The foreground application can then invoke an automated help application. The automatic help application (function) can query the user in order to determine if the user needs help. For example, the user can be prompted using an automated help application message 660 such as, "You seem confused. Do you need help?" The user interface can present a YES button 663 and a NO button 665. If the user selects YES, then more detailed information about the user's current circumstances can be displayed in a detailed automated help application message 662. In this way, embodiments allow applications to anticipate user confusion and/or frustration and proactively provide help. Thus, in embodiments, the emotion response action includes invoking an automated help application.

The human face provides a powerful communications medium through its ability to exhibit a myriad of expressions that can be captured and analyzed for a variety of purposes. In some cases, media producers are acutely interested in evaluating the effectiveness of message delivery by video media. Such video media includes advertisements, political messages, educational materials, television programs, movies, government service announcements, etc. Automated facial analysis can be performed on one or more video frames containing a face in order to detect facial action. Based on the facial action detected, a variety of parameters can be determined including affect valence, spontaneous reactions, facial action units, and so on. The parameters that are determined can be used to infer or predict emotional and cognitive states. For example, determined valence can be used to describe the emotional reaction of a viewer to a video media presentation or another type of presentation. Positive valence provides evidence that a viewer is experiencing a favorable emotional response to the video media presentation, while negative valence indicates provides evidence that a viewer is experiencing an unfavorable emotional response to the video media presentation. Other facial data analysis can include the determination of discrete emotional states of the viewer or viewers.

Facial data can be collected from a plurality of people using any of a variety of cameras. A camera can include a webcam, a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. In some embodiments, the person is permitted to "opt in" to the facial data collection. For example, the person can agree to the capture of facial data using a personal device such as a mobile device or another electronic device and can select an opt-in choice. Opting-in can then turn on the person's webcam-enabled device and can begin the capture of the person's facial data via a video feed from the webcam. The video data that is collected can include one or more persons experiencing an event. The one or more persons can be sharing a personal electronic device or can each be using one or more devices for video capture. The videos that are collected can be collected using a web-based framework. The web-based framework can be used to display the video media presentation or event as well as to collect videos from any number of viewers who are online. That is, the collection of videos can be crowdsourced from those viewers who elected to opt in to the video data collection.

The videos captured from the various viewers who chose to opt in can be substantially different in terms of video quality, frame rate, etc. As a result, the facial video data can be scaled, rotated, and otherwise adjusted to improve consistency. Human factors further play into the capture of the facial video data. The facial data that is captured might or might not be relevant to the video media presentation being displayed. For example, the viewer might not be paying attention, might be fidgeting, might be distracted by an object or event near the viewer, or might be otherwise inattentive to the video media presentation. The behavior exhibited by the viewer can prove challenging to analyze due to viewer actions including eating, speaking to another person or persons, speaking on the phone, etc. The videos collected from the viewers might also include other artifacts that pose challenges during the analysis of the video data. The artifacts can include such items as eyeglasses (because of reflections), eye patches, jewelry, and clothing that occludes or obscures the viewer's face. Similarly, a viewer's hair or hair covering can present artifacts by obscuring the viewer's eyes and/or face.

The captured facial data can be analyzed using the facial action coding system (FACS). The FACS seeks to define groups or taxonomies of facial movements of the human face. The FACS encodes movements of individual muscles of the face, where the muscle movements often include slight, instantaneous changes in facial appearance. The FACS encoding is commonly performed by trained observers, but can also be performed on automated computer-based systems. Analysis of the FACS encoding can be used to determine emotions of the persons whose facial data is captured in the videos. The FACS is used to encode a wide range of facial expressions that are anatomically possible for the human face. The FACS encodings include action units (AUs) and related temporal segments that are based on the captured facial expression. The AUs are open to higher order interpretation and decision-making. For example, the AUs can be used to recognize emotions experienced by the observed person. Emotion-related facial actions can be identified using the emotional facial action coding system (EM-FACS) and the facial action coding system affect interpretation dictionary (FACSAID), for example. For a given emotion, specific action units can be related to the emotion. For example, the emotion anger can be related to AUs 4, 5, 7, and 23, while happiness can be related to AUs 6 and 12. Other mappings of emotions to AUs have also been previously associated. The coding of the AUs can include an intensity scoring that ranges from A (trace) to E (maximum). The AUs can be used for analyzing images to identify patterns indicative of a particular mental and/or emotional state. The AUs range in number from 0 (neutral face) to 98 (fast up-down look). The AUs include so-called main codes (inner brow raiser, lid tightener, etc.), head movement codes (head turn left, head up, etc.), eye movement codes (eyes turned left, eyes up, etc.), visibility codes (eyes not visible, entire face not visible, etc.), and gross behavior codes (sniff, swallow, etc.). Emotion scoring can be included where intensity is evaluated as well as specific emotions, moods, or cognitive states.

The coding of faces identified in videos captured of people observing an event can be automated. The automated systems can detect facial AUs or discrete emotional states. The emotional states can include amusement, fear, anger, disgust, surprise, and sadness, for example. The automated systems can be based on a probability estimate from one or more classifiers, where the probabilities can correlate with an intensity of an AU or an expression. The classifiers can be used to identify into which of a set of categories a given observation can be placed. For example, the classifiers can be used to determine a probability that a given AU or expression is present in a given frame of a video. The classifiers can be used as part of a supervised machine learning technique where the machine learning technique can be trained using "known good" data. Once trained, the machine learning technique can proceed to classify new data that is captured.

The supervised machine learning models can be based on support vector machines (SVMs). An SVM can have an associated learning model that is used for data analysis and pattern analysis. For example, an SVM can be used to classify data that can be obtained from collected videos of people experiencing a media presentation. An SVM can be trained using "known good" data that is labeled as belonging to one of two categories (e.g. smile and no-smile). The SVM can build a model that assigns new data into one of the two categories. The SVM can construct one or more hyperplanes that can be used for classification. The hyperplane that has the largest distance from the nearest training point can be determined to have the best separation. The largest separation can improve the classification technique by increasing the probability that a given data point can be properly classified.

In another example, a histogram of oriented gradients (HOG) can be computed. The HOG can include feature descriptors and can be computed for one or more facial regions of interest. The regions of interest of the face can be located using facial landmark points, where the facial landmark points can include outer edges of nostrils, outer edges of the mouth, outer edges of eyes, etc. A HOG for a given region of interest can count occurrences of gradient orientation within a given section of a frame from a video, for example. The gradients can be intensity gradients and can be used to describe an appearance and a shape of a local object. The HOG descriptors can be determined by dividing an image into small, connected regions, also called cells. A histogram of gradient directions or edge orientations can be computed for pixels in the cell. Histograms can be contrast-normalized based on intensity across a portion of the image or the entire image, thus reducing any influence from illumination or shadowing changes between and among video frames. The HOG can be computed on the image or on an adjusted version of the image, where the adjustment of the image can include scaling, rotation, etc. For example, the image can be adjusted by flipping the image around a vertical line through the middle of a face in the image. The symmetry plane of the image can be determined from the tracker points and landmarks of the image.

In an embodiment, an automated facial analysis system identifies five facial actions or action combinations in order to detect spontaneous facial expressions for media research purposes. Based on the facial expressions that are detected, a determination can be made with regard to the effectiveness of a given video media presentation, for example. The system can detect the presence of the AUs or the combination of AUs in videos collected from a plurality of people. The facial analysis technique can be trained using a web-based framework to crowdsource videos of people as they watch online video content. The video can be streamed at a fixed frame rate to a server. Human labelers can code for the presence or absence of facial actions including symmetric smile, unilateral smile, asymmetric smile, and so on. The trained system can then be used to automatically code the facial data collected from a plurality of viewers experiencing video presentations (e.g. television programs).

Spontaneous asymmetric smiles can be detected in order to understand viewer experiences. The detection can be treated as a binary classification problem, where images that contain a right asymmetric expression are used as positive (target class) samples and all other images as negative (non-target class) samples. Classifiers perform the classification, including classifiers such as support vector machines (SVM) and random forests. Random forests can include ensemble-learning methods that use multiple learning algorithms to obtain better predictive performance. Frame-by-frame detection can be performed to recognize the presence of an asymmetric expression in each frame of a video. Facial points can be detected including the top of the mouth and the two outer eye corners. The face can be extracted, cropped, and warped into a pixel image of specific dimension (e.g. 96×96 pixels). In embodiments, the inter-ocular distance and vertical scale in the pixel image are fixed. Feature extraction can be performed using computer vision software such as OpenCV™. Feature extraction can be based on the use of HOGs. HOGs include feature descriptors and are used to count occurrences of gradient orientation in localized portions or regions of the image. Other techniques can be used for counting occurrences of gradient orientation, including edge orientation histograms, scale-invariant feature transformation descriptors, etc. The AU recognition tasks can also be performed using Local Binary Patterns (LBPs) and Local Gabor Binary Patterns (LGMPs). The HOG descriptor represents the face as a distribution of intensity gradients and edge directions, and is robust in its ability to translate and scale. Differing patterns including groupings of cells of various sizes and arranged in variously sized cell blocks can be used. For example, 4×4 cell blocks of 8×8 pixel cells with an overlap of half of the block can be used. Histograms of channels can be used, including nine channels or bins evenly spread over 0-180 degrees. In this example, the HOG descriptor on a 96×96 image is 25 blocks×16 cells×9 bins=3600, the latter quantity representing the dimension. AU occurrences can be rendered. Related literature indicates that as many asymmetric smiles occur on the right hemi face as on the left hemi face as reported for spontaneous expressions. The videos can be grouped into demographic datasets based on nationality and/or other demographic parameters for further detailed analysis.

Figure 7:
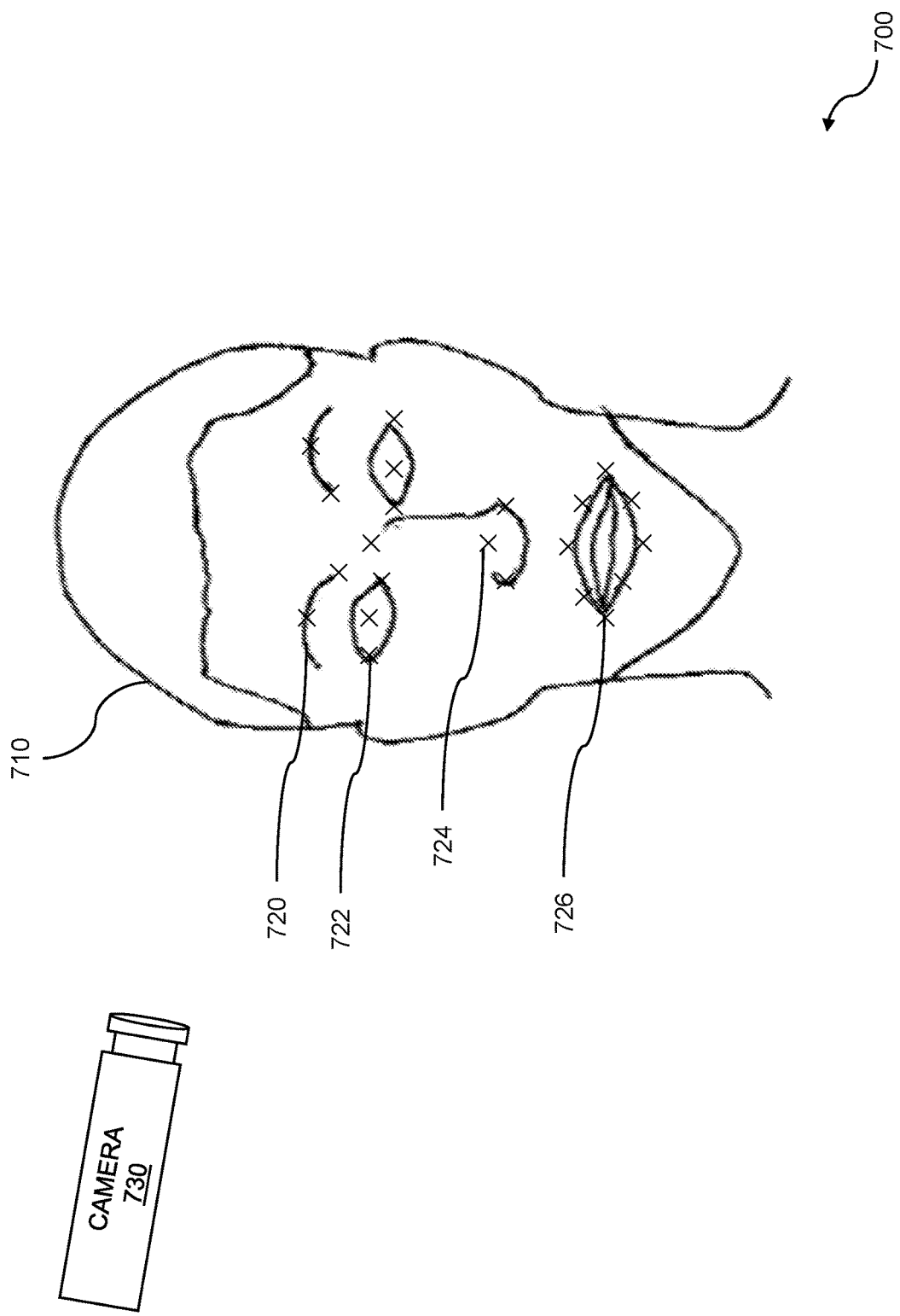
FIG. 7 shows example facial data collection including landmarks.

FIG. 7 shows a diagram 700 illustrating example facial data collection including landmarks. A face 710 can be observed using a camera 730 in order to collect facial data that includes facial landmarks. The facial data can be collected from a plurality of people using one or more of a variety of cameras. As discussed above, the camera or cameras can include a webcam, where a webcam can include a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. The quality and usefulness of the facial data that is captured can depend, for example, on the position of the camera 730 relative to the face 710, the number of cameras used, the illumination of the face, etc. For example, if the face 710 is poorly lit or over-exposed (e.g. in an area of bright light), the processing of the facial data to identify facial landmarks might be rendered more difficult. In another example, the camera 730 being positioned to the side of the person might prevent capture of the full face. Other artifacts can degrade the capture of facial data. For example, the person's hair, prosthetic devices (e.g. glasses, an eye patch, and eye coverings), jewelry, and clothing can partially or completely occlude or obscure the person's face. Data relating to various facial landmarks can include a variety of facial features. The facial features can comprise an eyebrow 720, an outer eye edge 722, a nose 724, a corner of a mouth 726, and so on. Any number of facial landmarks can be identified from the facial data that is captured. The facial landmarks that are identified can be analyzed to identify facial action units. For example, the action units that can be identified include AU02 outer brow raiser, AU14 dimpler, AU17 chin raiser, and so on. Any number of action units can be identified. The action units can be used alone and/or in combination to infer one or more cognitive states and emotions. A similar process can be applied to gesture analysis (e.g. hand gestures).

Figure 8:
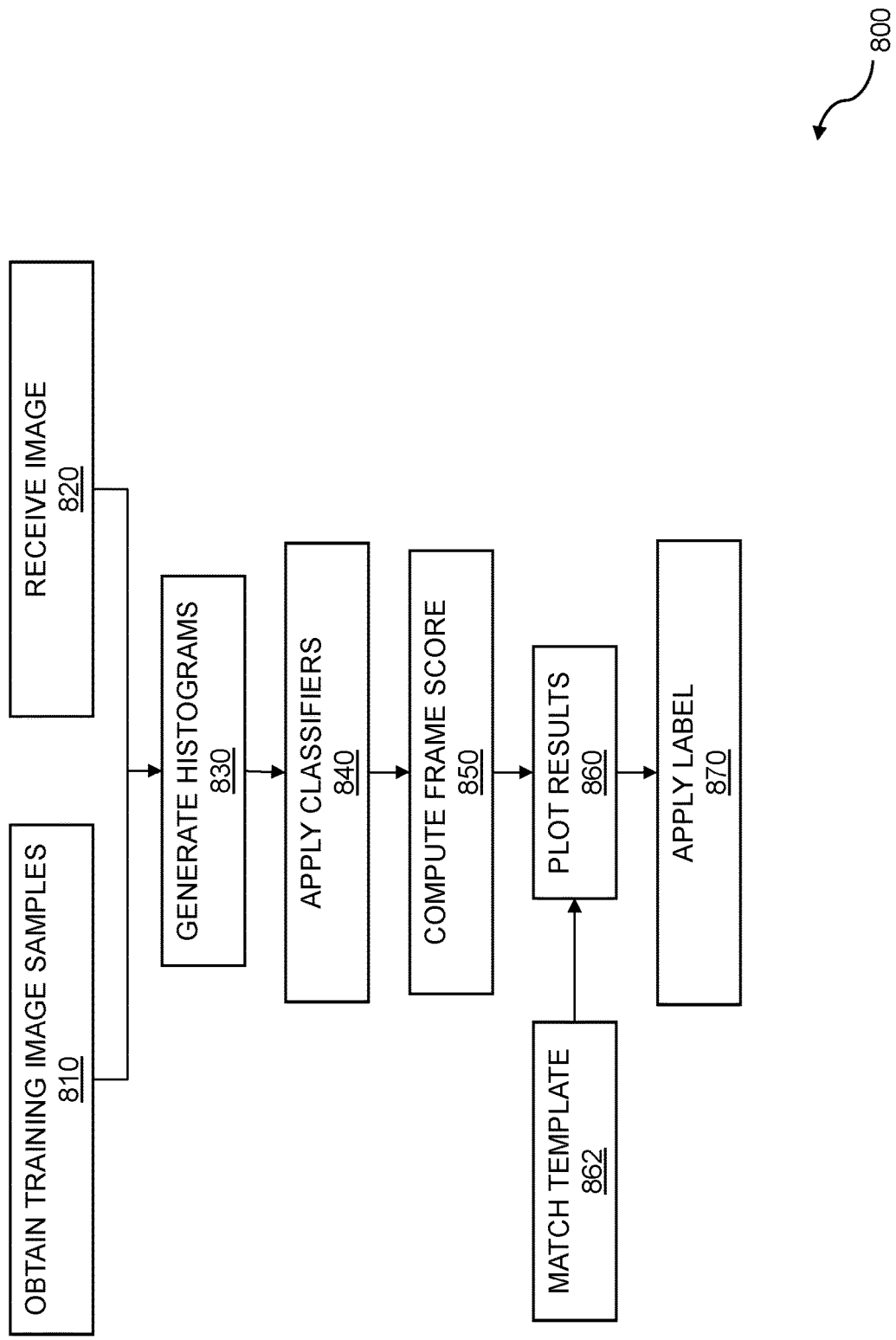
FIG. 8 is a flow for detecting facial expressions.

FIG. 8 is a flow for detecting facial expressions. The flow 800 can be used to automatically detect a wide range of facial expressions. A facial expression can produce strong emotional signals that can indicate valence and discrete emotional states. The discrete emotional states can include contempt, doubt, defiance, happiness, fear, anxiety, and so on. The detection of facial expressions can be based on the location of facial landmarks. The detection of facial expressions can be based on determination of action units (AUs) where the action units are determined using FACS coding. The AUs can be used singly or in combination to identify facial expressions. Based on the facial landmarks, one or more AUs can be identified by number and intensity. For example, AU12 can be used to code a lip corner puller and can be used to infer a smirk.

The flow 800 begins by obtaining training image samples 810. The image samples can include a plurality of images of one or more people. Human coders who are trained to correctly identify AU codes based on the FACS can code the images. The training or "known good" images can be used as a basis for training a machine learning technique. Once trained, the machine learning technique can be used to identify AUs in other images that can be collected using a camera 730, for example. The flow 800 continues with receiving an image 820. The image 820 can be received from the camera 730. As discussed above, the camera or cameras can include a webcam, where a webcam can include a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. The image 820 that is received can be manipulated in order to improve the processing of the image. For example, the image can be cropped, scaled, stretched, rotated, flipped, etc. in order to obtain a resulting image that can be analyzed more efficiently. Multiple versions of the same image can be analyzed. For example, the manipulated image and a flipped or mirrored version of the manipulated image can be analyzed alone and/or in combination to improve analysis. The flow 800 continues with generating histograms 830 for the training images and the one or more versions of the received image. The histograms can be generated for one or more versions of the manipulated received image. The histograms can be based on a HOG or another histogram. As described above, the HOG can include feature descriptors and can be computed for one or more regions of interest in the training images and the one or more received images. The regions of interest in the images can be located using facial landmark points, where the facial landmark points can include outer edges of nostrils, outer edges of the mouth, outer edges of eyes, etc. A HOG for a given region of interest can count occurrences of gradient orientation within a given section of a frame from a video, for example.

The flow 800 continues with applying classifiers 840 to the histograms. The classifiers can be used to estimate probabilities where the probabilities can correlate with an intensity of an AU or an expression. The choice of classifiers used can be based on the training of a supervised learning technique to identify facial expressions, for example. The classifiers can be used to identify into which of a set of categories a given observation can be placed. For example, the classifiers can be used to determine a probability that a given AU or expression is present in a given image or frame of a video. In various embodiments, the one or more AUs that are present include AU01 inner brow raiser, AU12 lip corner puller, AU38 nostril dilator, and so on. In practice, the presence or absence of any number of AUs can be determined. The flow 800 continues with computing a frame score 850. The score computed for an image, where the image can be a frame from a video, can be used to determine the presence of a facial expression in the image or video frame. The score can be based on one or more versions of the image 820 or manipulated image. For example, the score can be based on a comparison of the manipulated image to a flipped or mirrored version of the manipulated image. The score can be used to predict a likelihood that one or more facial expressions are present in the image. The likelihood can be based on computing a difference between the outputs of a classifier used on the manipulated image and on the flipped or mirrored image, for example. The classifier that is used can be used to identify symmetrical facial expressions (e.g. smile), asymmetrical facial expressions (e.g. outer brow raiser), and so on.

The flow 800 continues with plotting results 860. The results that are plotted can include one or more scores for one or frames computed over a given time t. For example, the plotted results can include classifier probability results from analysis of HOGs for a sequence of images and video frames. The plotted results can be matched with a template 862. The template can be temporal and can be represented by a centered box function or another function. A best fit with one or more templates can be found by computing a minimum error. Other best-fit techniques can include polynomial curve fitting, geometric curve fitting, and so on. The flow 800 continues with applying a label 870. The label can be used to indicate that a particular facial expression has been detected in the one or more images or video frames of the image 820. For example, the label can be used to indicate that any of a range of facial expressions has been detected, including a smile, an asymmetric smile, a frown, and so on. In embodiments, a convolutional neural network or other neural network can be trained using the training image samples.

Figure 9:
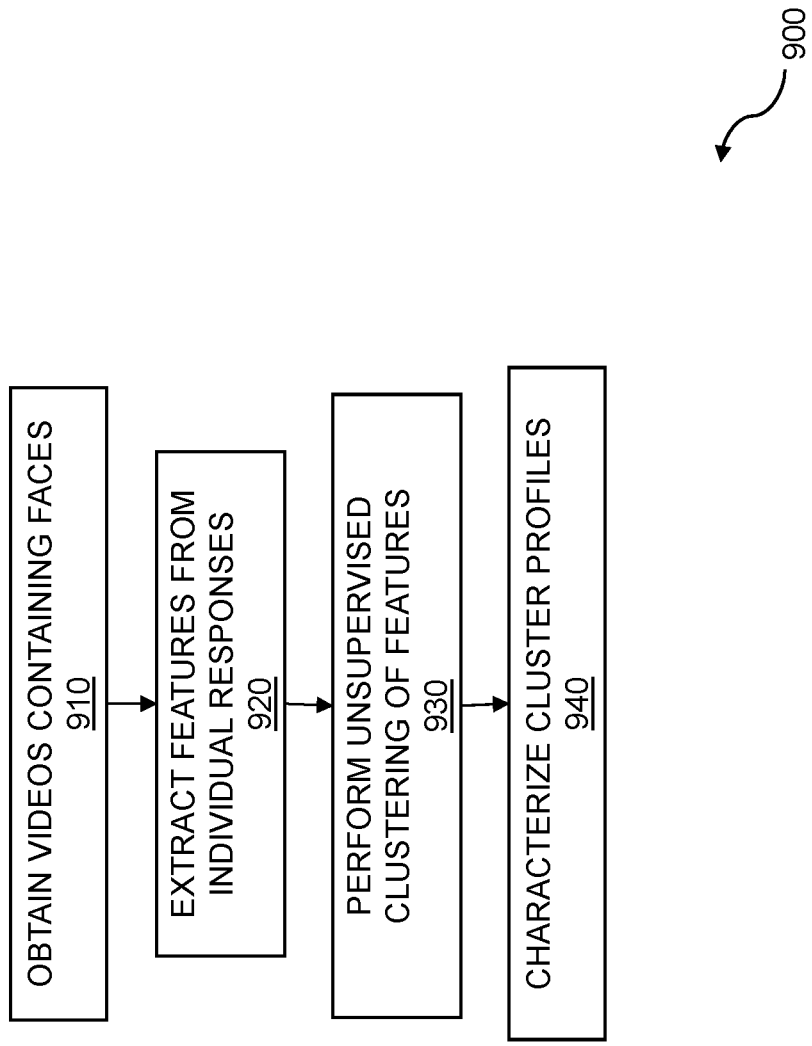
FIG. 9 is a flow for the large-scale clustering of facial events.

FIG. 9 is a flow 900 for the large-scale clustering of facial events. As discussed above, collection of facial video data from one or more people can include a web-based framework. The web-based framework can be used to collect facial video data from large numbers of people located over a wide geographic area, for example. The web-based framework can include an opt-in feature that allows people to agree to facial data collection. The web-based framework can be used to render and display data to one or more people and can collect data from the one or more people. For example, the facial data collection can be based on showing one or more viewers a video media presentation through a website. The web-based framework can be used to display the video media presentation or event and to collect videos from any number of viewers who are online. That is, the collection of videos can be crowdsourced from those viewers who elected to opt in to the video data collection. The video event can be a commercial, a political ad, an educational segment, etc. The flow 900 begins with obtaining videos containing faces 910. The videos can be obtained using one or more cameras, where the cameras can include a webcam coupled to one or more devices employed by the one or more people using the web-based framework. The flow 900 continues with extracting features from the individual responses 920. The individual responses can include videos containing faces observed by the one or more webcams. The features that are extracted can include facial features such as an eyebrow, a nostril, an eye edge, a mouth edge, and so on. The feature extraction can be based on facial coding classifiers, where the facial coding classifiers output a probability that a specified facial action has been detected in a given video frame. The flow 900 continues with performing unsupervised clustering of features 930. The unsupervised clustering can be based on an event. The unsupervised clustering can be based on a K-Means, where the K of the K-Means can be computed using a Bayesian Information Criterion (BICk), for example, to determine the smallest value of K that meets system requirements. Any other criterion for K can be used. The K-Means clustering technique can be used to group one or more events into various respective categories. The flow 900 continues with characterizing cluster profiles 940. The profiles can include a variety of facial expressions and can include smiles, asymmetric smiles, eyebrow raisers, eyebrow lowerers, etc. The profiles can be related to a given event. For example, a humorous video can be displayed in the web-based framework and the video data of people who have opted-in can be collected. The characterization of the collected and analyzed video can depend in part on the number of smiles that occurred at various points throughout the humorous video. Similarly, the characterization can be performed on collected and analyzed videos of people viewing a news presentation. The characterized cluster profiles can be further analyzed based on demographic data. For example, the number of smiles resulting from people viewing a humorous video can be compared to various demographic groups, where the groups can be formed based on geographic location, age, ethnicity, gender, and so on.

Figure 10:
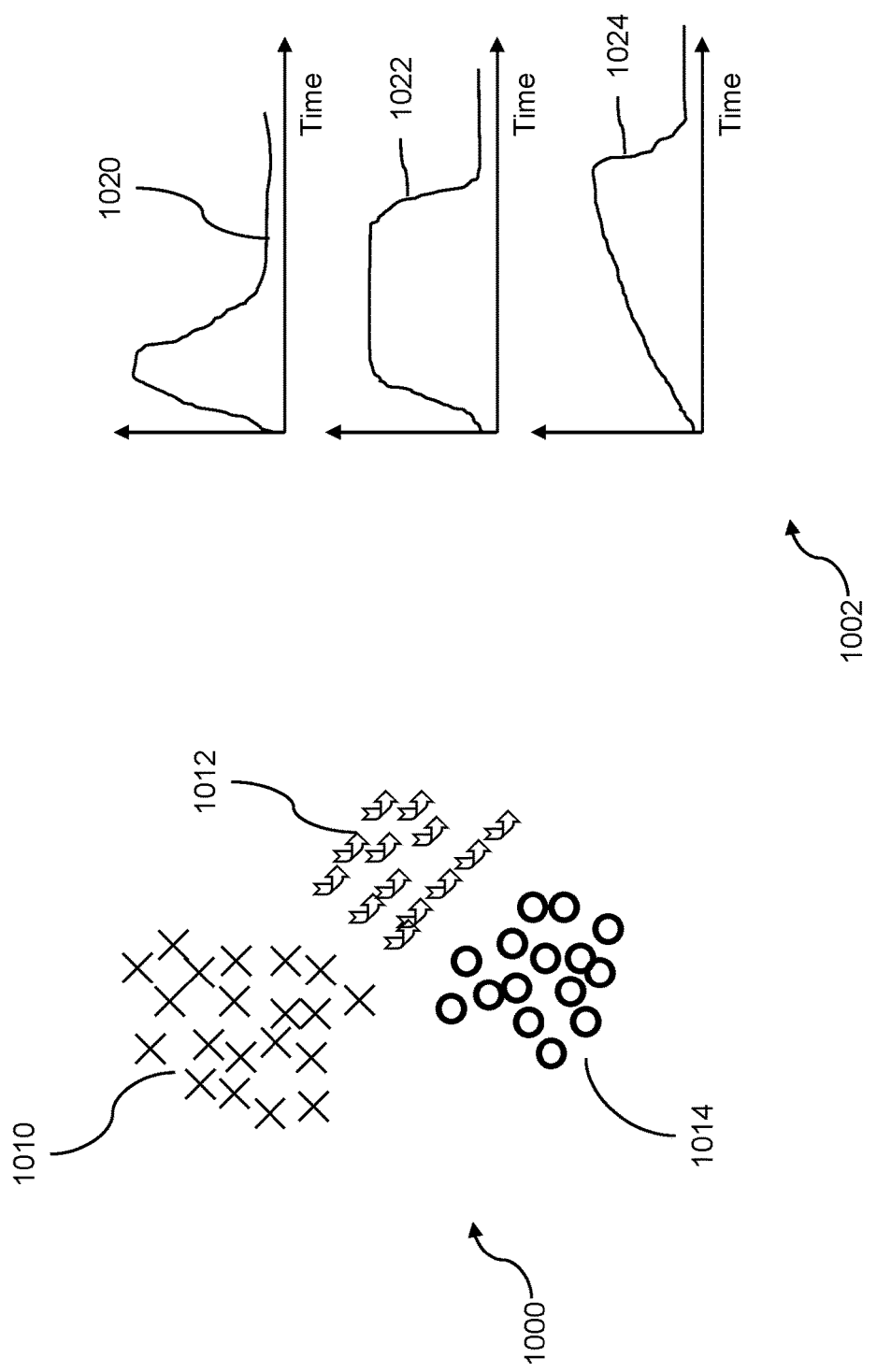
FIG. 10 shows example unsupervised clustering of features and characterizations of cluster profiles.

FIG. 10 shows example unsupervised clustering of features and characterization of cluster profiles. Features including samples of facial data can be clustered using unsupervised clustering. Various clusters can be formed, which include similar groupings of facial data observations. The example 1000 shows three clusters 1010, 1012, and 1014. The clusters can be based on video collected from people who have opted-in to video collection. When the data collected is captured using a web-based framework, then the data collection can be performed on a grand scale, including hundreds, thousands, or even more participants who can be located locally and/or across a wide geographic area. Unsupervised clustering is a technique that can be used to process the large amounts of captured facial data and to identify groupings of similar observations. The unsupervised clustering can also be used to characterize the groups of similar observations. The characterizations can include identifying behaviors of the participants. The characterizations can be based on identifying facial expressions and facial action units of the participants. Some behaviors and facial expressions can include faster or slower onsets, faster or slower offsets, longer or shorter durations, etc. The onsets, offsets, and durations can all correlate to time. The data clustering that results from the unsupervised clustering can support data labeling. The labeling can include FACS coding. The clusters can be partially or totally based on a facial expression resulting from participants viewing a video presentation, where the video presentation can be an advertisement, a political message, educational material, a public service announcement, and so on. The clusters can be correlated with demographic information, where the demographic information can include educational level, geographic location, age, gender, income level, and so on.

Cluster profiles 1002 can be generated based on the clusters that can be formed from unsupervised clustering, with time shown on the x-axis and intensity or frequency shown on the y-axis. The cluster profiles can be based on captured facial data including facial expressions, for example. The cluster profile 1020 can be based on the cluster 1010, the cluster profile 1022 can be based on the cluster 1012, and the cluster profile 1024 can be based on the cluster 1014. The cluster profiles 1020, 1022, and 1024 can be based on smiles, smirks, frowns, or any other facial expression. Emotional states of the people can be inferred by analyzing the clustered facial expression data. The cluster profiles can be plotted with respect to time and can show a rate of onset, a duration, and an offset (rate of decay). Other time-related factors can be included in the cluster profiles. The cluster profiles can be correlated with demographic information as described above.

Figure 11A:
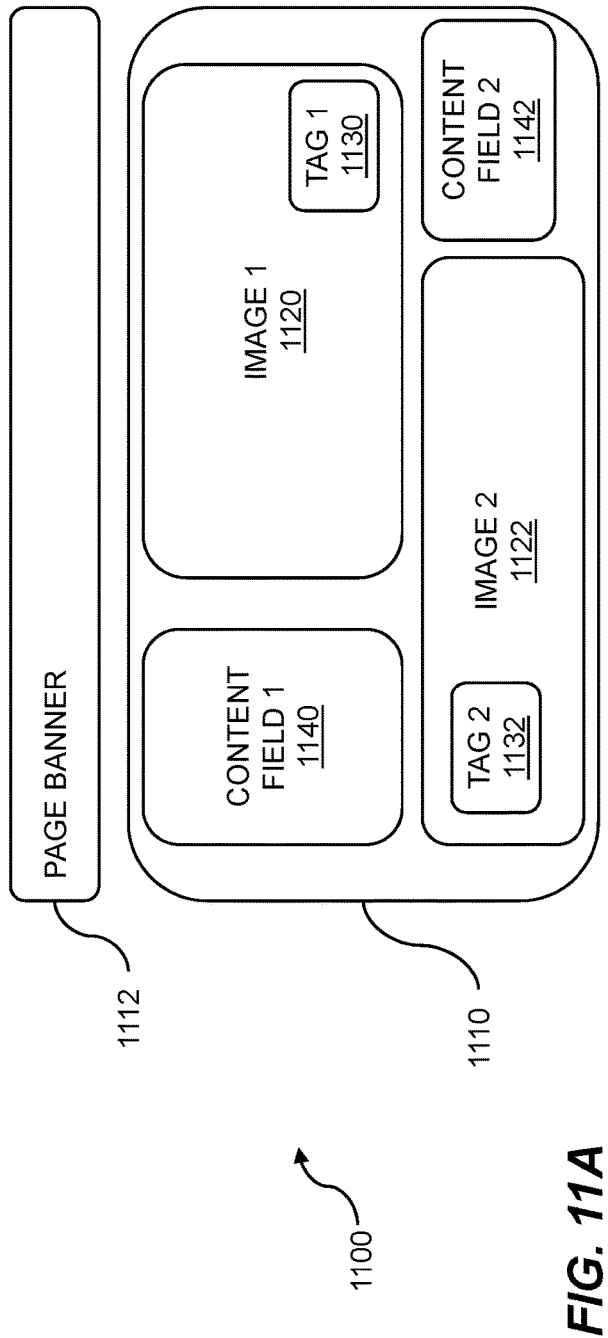
FIG. 11A shows example tags embedded in a webpage.

FIG. 11A shows example tags embedded in a webpage. A webpage 1100 can include a page body 1110, a page banner 1112, and so on. The page body can include one or more objects, where the objects can include text, images, videos, audios, and so on. The example page body 1110 includes a first image, image 1 1120, a second image, image 2 1122, a first content field, content field 1 1140, and a second content field, content field 2 1142. In practice, the page body 1110 can contain any number of images and content fields, and can include one or more videos, one or more audios, and so on. The page body can include embedded tags, tag 1 1130 and tag 2 1132. In the example shown, tag 1 1130 is embedded in image 1 1120, and tag 2 1132 is embedded in image 2 1122. In embodiments, any number of tags can be embedded. Tags can also be embedded in content fields, in videos, in audios, etc. When a user mouses over a tag, or clicks on an object associated with a tag, the tag can be invoked. For example, when the user mouses over tag 1, then tag 1 can be invoked. Invoking tag 1 can include enabling a camera coupled to a user's device and can include capturing one or more images of the user as the user views a digital experience. In a similar manner, when the user mouses over tag 2, tag 2 can be invoked. Invoking tag 2 can include enabling the camera and capturing images of the user. In other embodiments, other actions can be taken based on invocation of the one or more tags. For example, invoking an embedded tag can initiate an analysis technique, post to social media, award to the user a coupon or other prize, initiate cognitive state analysis, perform emotion analysis, and so on.

Figure 11B:
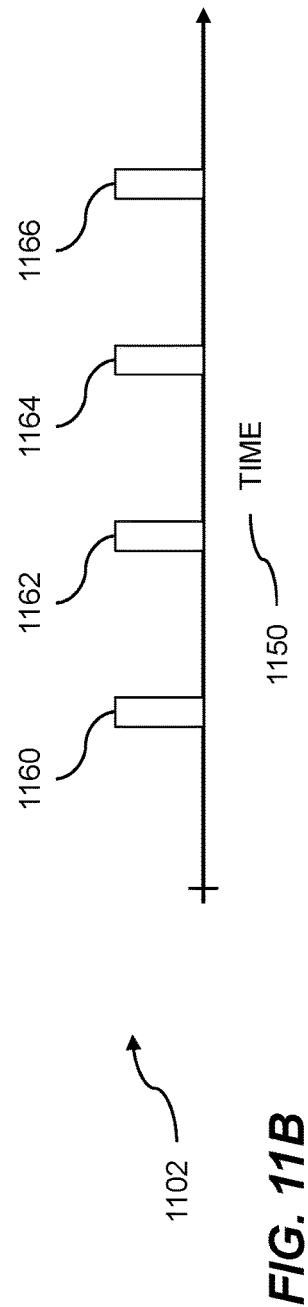
FIG. 11B shows example of invoking tag to collect images.

FIG. 11B shows example tag invoking to collect images. As stated above, a digital experience can be a video, a webpage, and so on. A video 1102 can include one or more embedded tags tag 1160, tag 1162, tag 1164, tag 1166, and so on. In practice, any number of tags can be included in the digital experience. The one or more tags can be invoked during the digital experience. The collection of the invoked tags can occur over time as represented by timeline 1150. When a tag is encountered in the digital experience, the tag can be invoked. For example, when tag 1160 is encountered, invoking the tag can enable a camera coupled to a user device and can capture one or more images of the user viewing the digital experience. Invoking a tag can depend on opt-in by the user. For example, if a user has agreed to participate in a study by indicating opt-in, then the camera coupled to the user device can be enabled and one or more images of the user can be captured. If the user has not agreed to participate in the study and has not indicated opt-in, then invoking tag 1160 does not enable the camera nor capture images of the user during the digital experience. The user can indicate opt-in for certain types of participation, where opt-in can be dependent on content in the digital experience. For example, the user could opt in to participate in a study of political campaign messages and not opt in for a particular advertisement study. In that case, tags embedded in the digital experiences that are related to political campaign messages can enable the camera and image capture when invoked. But tags embedded in the digital experiences that are related to advertisements would not enable the camera when invoked. Various other situations of tag invocation are possible.

Figure 12:
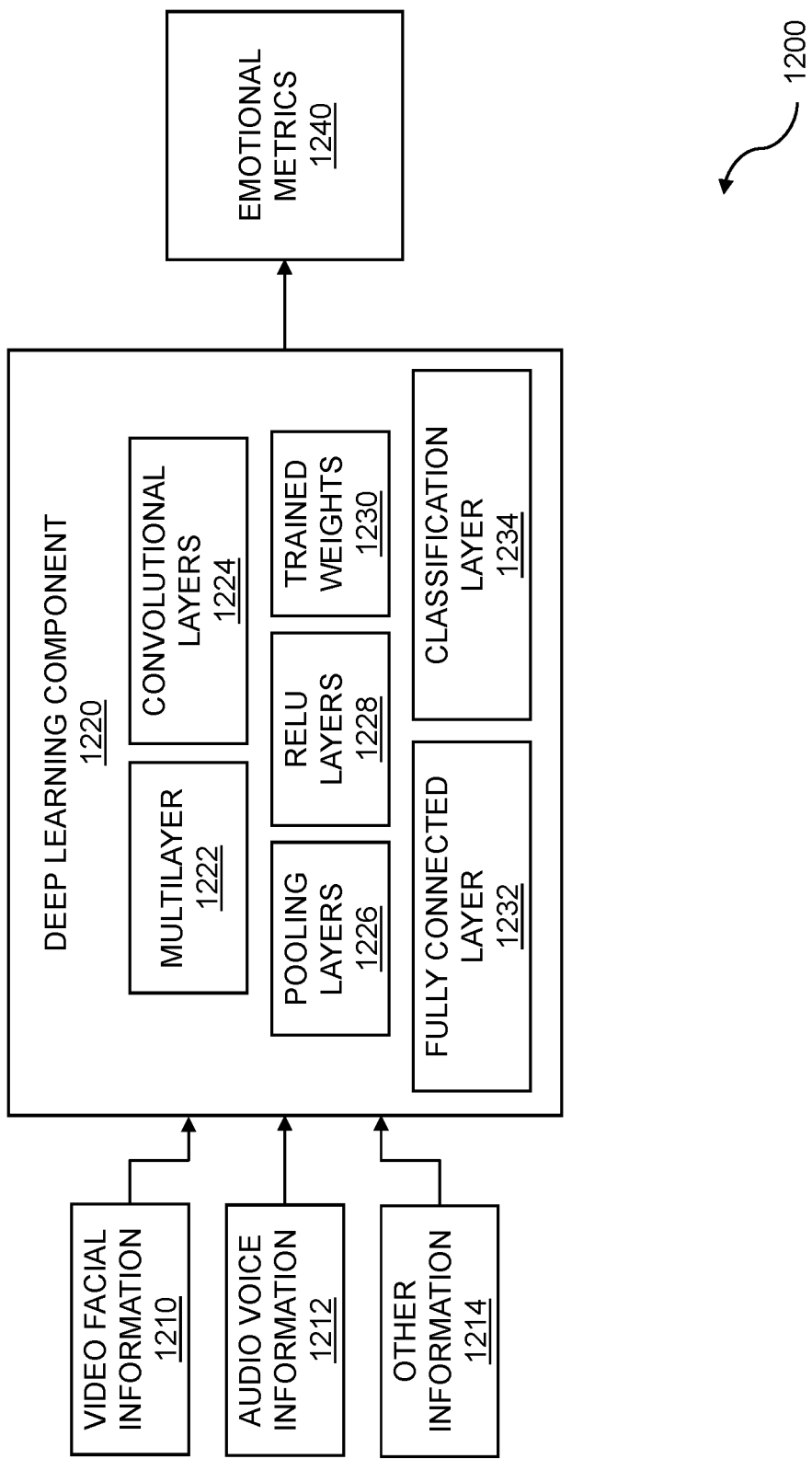
FIG. 12 illustrates a high-level diagram for deep learning.

FIG. 12 illustrates a high-level diagram for deep learning. Multimodal machine learning can be based on deep learning. A plurality of information channels is captured into a computing device such as a smartphone, personal digital assistant (PDA), tablet, laptop computer, and so on. The plurality of information channels includes contemporaneous audio information and video information from an individual. Trained weights are learned on a multilayered convolutional computing system. The trained weights are learned using the audio information and the video information from the plurality of information channels. The trained weights cover both the audio information and the video information and are trained simultaneously. The learning facilitates emotional analysis of the audio information and the video information. Further information is captured into a second computing device. The second computing device and the first computing device may be the same computing device. The further information can include physiological information, contextual information, and so on. The further information is analyzed using the trained weights to provide an emotion metric based on the further information.

Understanding and evaluating cognitive states, which include moods, emotions, and/or mental states, requires a nuanced evaluation of facial expressions, audio expressions, or other cues generated by people. Cognitive state analysis is important in many areas such as research, psychology, business, intelligence, law enforcement, and so on. The understanding of cognitive states can be used in a variety of fields, such as improving marketing analysis, assessing the effectiveness of customer service experiences and retail experiences, and evaluating the consumption of content such as movies and videos. Identifying points of frustration in a customer transaction can allow a company to take action to address the causes of the frustration. By streamlining processes, key performance areas such as customer satisfaction and customer transaction throughput can be improved, resulting in increased sales and revenues.

Deep learning is a branch of machine learning which seeks to imitate in software the activity which takes place in layers of neurons in the neocortex of the human brain. Deep learning applications include processing of image data, audio data, and so on. FIG. 12 illustrates a high-level diagram for deep learning 1200. The deep learning can be accomplished using a multilayered convolutional computing system, a convolutional neural network, or other techniques. The deep learning can accomplish image analysis, audio analysis, and other analysis tasks. A deep learning component 1220 collects and analyzes various types of information from a plurality of information channels. The information channels can include video facial information 1210, audio voice information 1212, other information 1214, and so on. In embodiments, the other information can include one or more of electrodermal activity, heart rate, heart rate variability, skin temperature, blood pressure, muscle movements, or respiration.

Returning to the deep learning component 1220, the deep learning component can include a multilayered convolutional computing system 1222. The multilayered convolutional computing system 1222 can include a plurality of layers of varying types. The layers can include one or more convolutional layers 1224 which can be used for learning and analysis. The convolutional layers can include pooling layers 1226 which can combine the outputs of clusters into a single datum. The layers can include one or more Rectified Linear Unit (ReLU) layers 1228. The one or more ReLU layers can implement an activation function such as $f(x)=\max(0,x)$, thus providing an activation with a threshold at zero. The convolutional layers can include trained weights 1230. The trained weights can be based on learning, where the learning uses information collected from one or more individuals via a plurality of information channels. The trained weights can be used to enable the multilayer convolutional computing system to determine image characteristics, voice characteristics, and so on.

The deep learning component 1220 can include a fully connected layer 1232. The fully connected layer 1232 processes each data point from the output of a collection of intermediate layers. The fully connected layer 1232 takes all data points in the previous layer and connects them to every single node contained within the fully connected layer. The output of the fully connected layer 1232 can provide input to a classification layer 1234. The classification layer can be used to classify emotional states, mental states, moods, and so on, which can all be combined under the term cognitive states. The classification can be based on using classifiers. The deep learning component 1220 provides data that includes emotional metrics 1240. The emotional metrics can include an emotional type, a number of occurrences of the emotional type, the intensity of the emotional type, and so on. The emotional metric can be based on a threshold value, on a target value, on a goal, etc. The emotional metric can be based on emotional types that can occur over a period of time. More than one emotional metric can be provided.

Figure 13:
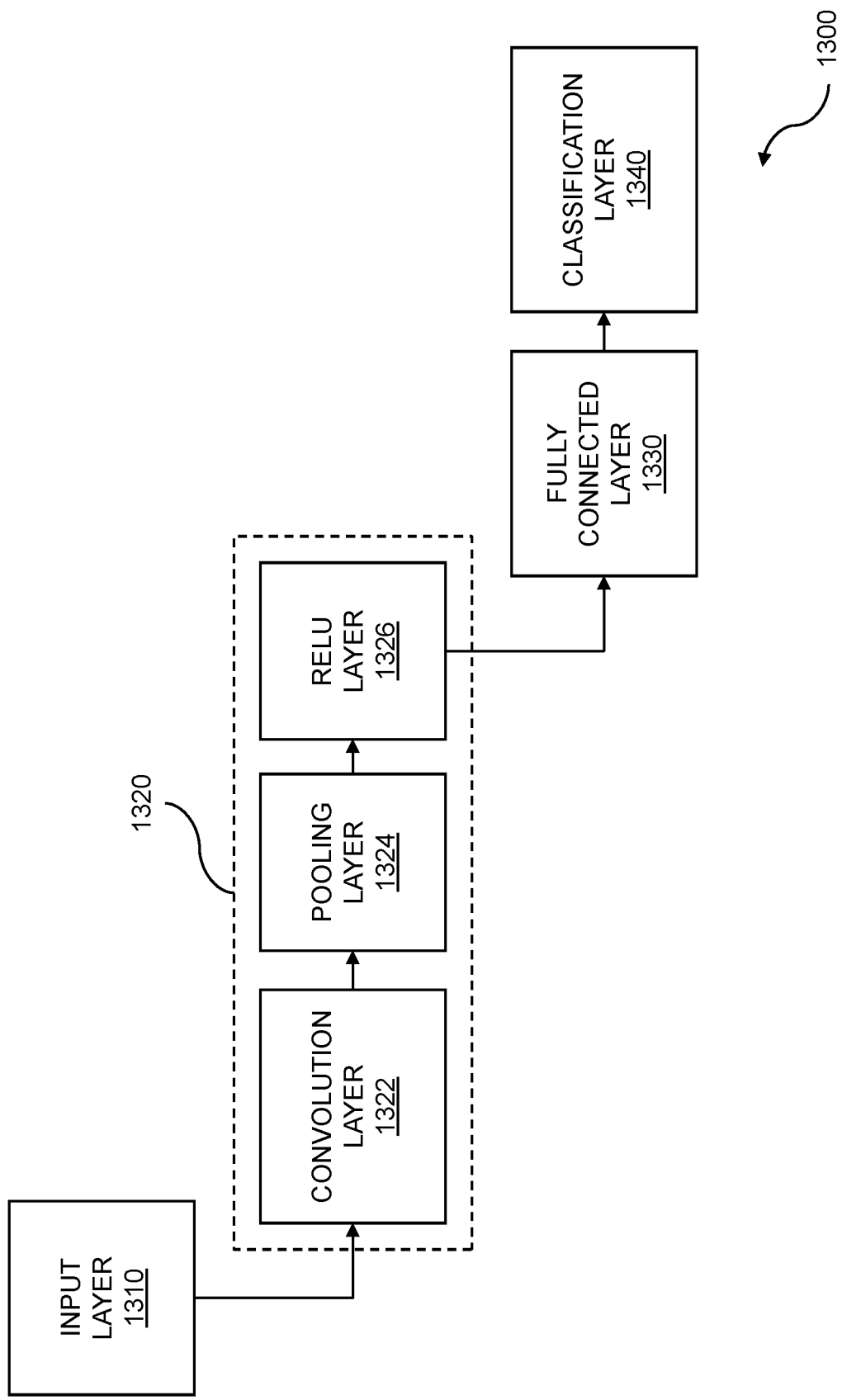
FIG. 13 is an example showing a convolutional neural network.

FIG. 13 is an example showing a convolutional neural network. A convolutional neural network can be used for multimodal machine learning. A plurality of information channels is captured into a computing device. The plurality of information channels includes contemporaneous audio information and video information from an individual. Trained weights are learned on a multilayered convolutional computing system. The trained weights are learned using the audio information and the video information from the plurality of information channels, where the trained weights cover both the audio information and the video information and are trained simultaneously, and where the learning facilitates emotional analysis of the audio information and the video information. Further information is captured into a second computing device. The further information is analyzed using the trained weights to provide an emotion metric based on the further information.

Emotion analysis is a very complex task. Understanding and evaluating moods, emotions, or cognitive states requires a nuanced evaluation of facial expressions or other cues generated by people. Cognitive state analysis is important in many areas such as research, psychology, business, intelligence, law enforcement, and so on. The understanding of cognitive states can be used in a variety of fields, such as improving marketing analysis, assessing the effectiveness of customer service experiences and retail experiences, and evaluating the consumption of content such as movies and videos. Identifying points of frustration in a customer transaction can allow a company to take action to address the causes of the frustration. By streamlining processes, key performance areas such as customer satisfaction and customer transaction throughput can be improved, resulting in increased sales and revenues. In a content scenario, producing compelling content that achieves the desired effect (e.g. fear, shock, laughter, etc.) can result in increased ticket sales and/or increased advertising revenue. If a movie studio is producing a horror movie, it is desirable to know if the scary scenes in the movie are achieving the desired effect. By conducting tests in sample audiences, and analyzing faces in the audience, a computer-implemented method and system can process thousands of faces to assess the cognitive state at the time of the scary scenes. In many ways, such an analysis can be more effective than surveys that ask audience members questions, since audience members may consciously or subconsciously change answers based on peer pressure or other factors. However, spontaneous facial expressions can be more difficult to conceal or control. Thus, by analyzing facial expressions en masse, important information regarding the cognitive state of the audience can be obtained.

Analysis of facial expressions is also a complex undertaking. Image data, where the image data can include facial data, can be analyzed to identify a range of facial expressions. The facial expressions can include a smile, frown, smirk, and so on. The image data and facial data can be processed to identify the facial expressions. The processing can include analysis of expression data, action units, gestures, cognitive states, physiological data, and so on. Facial data as contained in the raw video data can include information on one or more action units such as head gestures, smiles, brow furrows, squints, lowered eyebrows, raised eyebrows, attention, and the like. The action units can be used to identify smiles, frowns, and other facial indicators of expressions. Gestures can also be identified, and can include a head tilt to the side, a forward lean, a smile, a frown, as well as many other gestures. Other types of data including the physiological data can be obtained, where the physiological data can be obtained using a camera or other image capture device, without contacting the person or persons. Respiration, heart rate, heart rate variability, perspiration, temperature, and other physiological indicators of cognitive state can be determined by analyzing the images and video data.

Analysis of expressions emanating from human audio is also highly complex. Audio data can include speech, grunts, groans, shouts, screams, and so on. Further, the method of how the audio is produced can greatly influence the one or more expressions extracted from the audio. As a result, the audio data, such as voice data, can be evaluated for timbre, prosody, vocal register, vocal resonance, pitch, loudness, speech rate, language content, and so on. The evaluation results can be associated with cognitive states, mental states, emotional states, moods, and so on. For example, loud, rapid, shrill speech can indicate anger, while moderate, controlled speech including polysyllabic words can indicate confidence.

Deep learning is a branch of machine learning which seeks to imitate in software the activity which takes place in layers of neurons in the neocortex of the human brain. This imitative activity can enable software to "learn" to recognize and identify patterns in data, where the data can include digital forms of images, sounds, and so on. The deep learning software is used to simulate the large array of neurons of the neocortex. This simulated neocortex, or artificial neural network, can be implemented using mathematical formulas that are evaluated on processors. With the ever-increasing capabilities of the processors, increasing numbers of layers of the artificial neural network can be processed.

Deep learning applications include processing of image data, audio data, and so on. Image data applications include image recognition, facial recognition, etc. Image data applications can include differentiating dogs from cats, identifying different human faces, and the like. The image data applications can include identifying moods, cognitive states, emotional states, and so on, from the facial expressions of the faces that are identified. Audio data applications can include analyzing audio input such as ambient room sounds, physiological sounds such as breathing or coughing, noises made by an individual such as tapping and drumming, voices, and so on. The voice data applications can include analyzing a voice for timbre, prosody, vocal register, vocal resonance, pitch, loudness, speech rate, or language content. The voice data analysis can be used to determine one or more moods, cognitive states, emotional states, etc.

The artificial neural network which forms the basis for deep learning is based on layers. The layers can include an input layer, a convolution layer, a fully connected layer, a classification layer, and so on. The input layer can receive input data such as image data, where the image data can include a variety of formats including pixel formats. The input layer can then perform processing tasks such as identifying boundaries of the face, identifying landmarks of the face, extracting features of the face, and/or rotating a face within the plurality of images. The convolution layer can represent an artificial neural network such as a convolutional neural network. A convolutional neural network can contain a plurality of hidden layers within it. A convolutional layer can reduce the amount of data feeding into a fully connected layer. The fully connected layer processes each pixel/data point from the convolutional layer. A last layer within the multiple layers can provide output indicative of cognitive state. The last layer of the convolutional neural network can be the final classification layer. The output of the final classification layer can be indicative of cognitive state of faces within the images that are provided to input layer.

Deep networks including deep convolutional neural networks can be used for facial expression parsing. A first layer of the deep network includes multiple nodes, where each node represents a neuron within a neural network. The first layer can receive data from an input layer. The output of the first layer can feed to a second layer, where the latter layer also includes multiple nodes. A weight can be used to adjust the output of the first layer which is being input to the second layer. Some layers in the convolutional neural network can be hidden layers. The output of the second layer can feed to a third layer. The third layer can also include multiple nodes. A weight can adjust the output of the second layer which is being input to the third layer. The third layer may be a hidden layer. Outputs of a given layer can be fed to next layer. Weights adjust the output of one layer as it is fed to the next layer. When the final layer is reached, the output of the final layer can be a facial expression, a cognitive state, a characteristic of a voice, and so on. The facial expression can be identified using a hidden layer from the one or more hidden layers. The weights can be provided on inputs to the multiple layers to emphasize certain facial features within the face. The convolutional neural network can be trained to identify facial expressions, voice characteristics, etc. The training can include assigning weights to inputs on one or more layers within the multilayered analysis engine. One or more of the weights can be adjusted or updated during training. The assigning of weights can be accomplished during a feed-forward pass through the multilayered neural network. In a feed-forward arrangement, the information moves forward, from the input nodes, through the hidden nodes and on to the output nodes. Additionally, the weights can be updated during a backpropagation process through the multilayered analysis engine.

Returning to the figure, FIG. 13 is an example showing a convolutional neural network 1300 for deep learning. The system for deep learning can be used for multimodal machine learning. The system for deep learning can be accomplished using a convolution neural network or other techniques. The deep learning can accomplish facial recognition and analysis tasks. The network includes an input layer 1310. The input layer 1310 receives image data. The image data can be input in a variety of formats, such as JPEG, TIFF, BMP, and GIF. Compressed image formats can be decompressed into arrays of pixels, wherein each pixel can include an RGB tuple. The input layer 1310 can then perform processing such as identifying boundaries of the face, identifying landmarks of the face, extracting features of the face, and/or rotating a face within the plurality of images.

The network includes a collection of intermediate layers 1320. The multilayered analysis engine can include a convolutional neural network. Thus, the intermediate layers can include a convolution layer 1322. The convolution layer 1322 can include multiple sublayers, including hidden layers within it. The output of the convolution layer 1322 feeds into a pooling layer 1324. The pooling layer 1324 performs a data reduction, which makes the overall computation more efficient. Thus, the pooling layer reduces the spatial size of the image representation to reduce the number of parameters and computation in the network. In some embodiments, the pooling layer is implemented using filters of size 2×2, applied with a stride of two samples for every depth slice along both width and height, resulting in a reduction of 75-percent of the downstream node activations. The multilayered analysis engine can further include a max pooling layer 1324. Thus, in embodiments, the pooling layer is a max pooling layer, in which the output of the filters is based on a maximum of the inputs. For example, with a 2×2 filter, the output is based on a maximum value from the four input values. In other embodiments, the pooling layer is an average pooling layer or L2-norm pooling layer. Various other pooling schemes are possible.

The intermediate layers can include a Rectified Linear Units (ReLU) layer 1326. The output of the pooling layer 1324 can be input to the ReLU layer 1326. In embodiments, the ReLU layer implements an activation function such as $f(x)$–$\max(0,x)$, thus providing an activation with a threshold at zero. In some embodiments, the ReLU layer 1326 is a leaky ReLU layer. In this case, instead of the activation function providing zero when x<0, a small negative slope is used, resulting in an activation function such as $f(x)=1(x<0)(ax)+1(x>=0)(x)$. This can reduce the risk of "dying ReLU" syndrome, where portions of the network can be "dead" with nodes/neurons that do not activate across the training dataset. The image analysis can comprise training a multilayered analysis engine using the plurality of images, wherein the multilayered analysis engine can comprise multiple layers that include one or more convolutional layers 1322 and one or more hidden layers, and wherein the multilayered analysis engine can be used for emotional analysis.

The example 1300 includes a fully connected layer 1330. The fully connected layer 1330 processes each pixel/data point from the output of the collection of intermediate layers 1320. The fully connected layer 1330 takes all neurons in the previous layer and connects them to every single neuron it has. The output of the fully connected layer 1330 provides input to a classification layer 1340. The output of the classification layer 1340 provides a facial expression and/or cognitive state as its output. Thus, a multilayered analysis engine such as the one depicted in FIG. 13 processes image data using weights, models the way the human visual cortex performs object recognition and learning, and provides effective analysis of image data to infer facial expressions and cognitive states.

Figure 14:
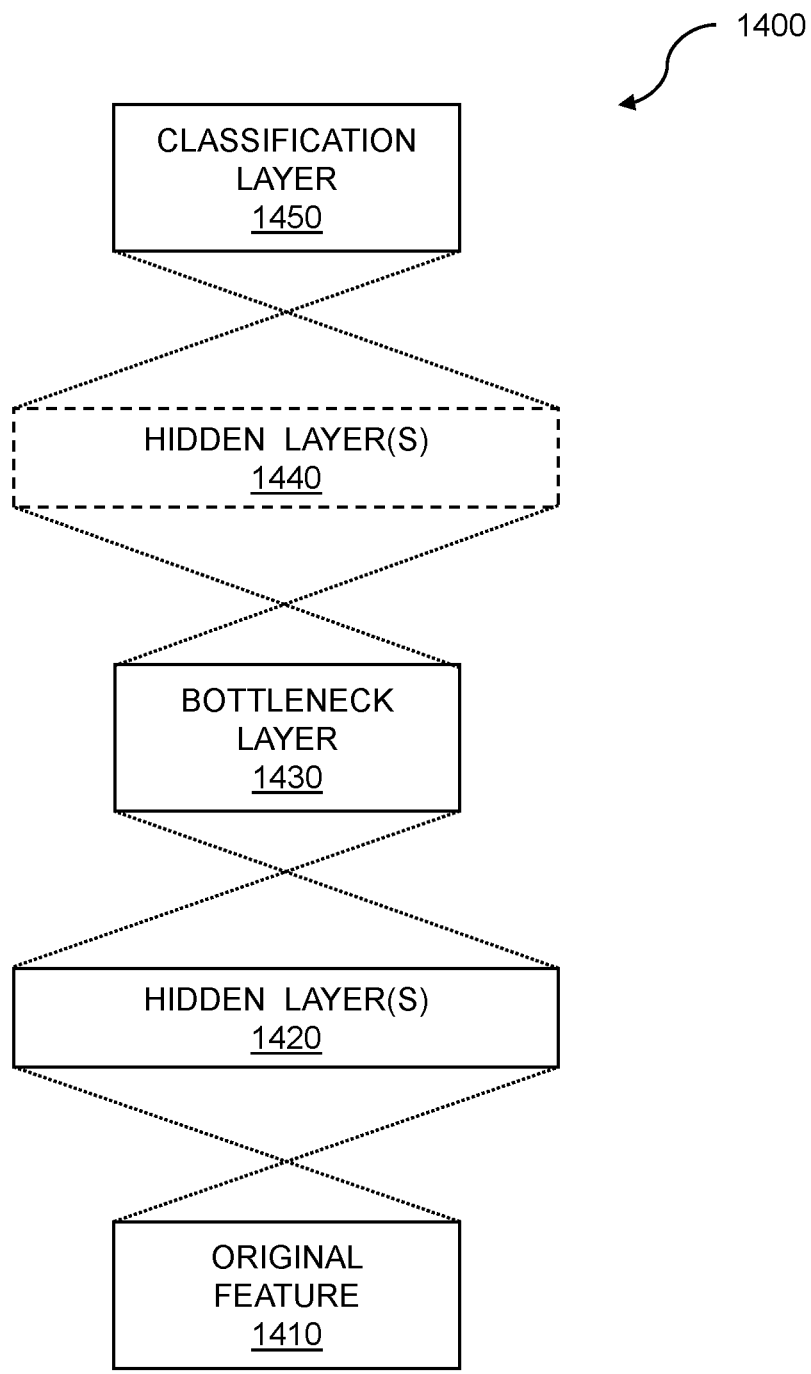
FIG. 14 illustrates a bottleneck layer within a deep learning environment.

FIG. 14 illustrates a bottleneck layer within a deep learning environment. A bottleneck layer can be a layer of a deep neural network, and can be used for audio analysis learning using video data. A deep neural network can apply audio classifiers. The audio classifiers are learned from analyzed facial data for a face within the video data. Video data that includes images of one or more people is obtained. Audio data that corresponds to the video data is also obtained. A face within the video data is identified, and a voice from the audio data is associated with the face. Using the learned audio classifiers, further audio data is analyzed.

Layers of a deep neural network can include a bottleneck layer 1400. A bottleneck layer can be used for a variety of applications such as facial recognition, voice recognition, emotional state recognition, and so on. The deep neural network in which the bottleneck layer is located can include a plurality of layers. The plurality of layers can include an original feature layer 1410. A feature such as an image feature can include points, edges, objects, boundaries between and among regions, properties, and so on. The deep neural network can include one or more hidden layers 1420. The one or more hidden layers can include nodes, where the nodes can include nonlinear activation functions and other techniques. The bottleneck layer can be a layer that learns translation vectors to transform a neutral face to an emotional or expressive face. In some embodiments, the translation vectors can transform a neutral sounding voice to an emotional or expressive voice. Specifically, activations of the bottleneck layer determine how the transformation occurs. A single bottleneck layer can be trained to transform a neutral face or voice to an emotional or expressive face or voice. In some cases, individual bottleneck layers can be trained for a transformation pair. At runtime, once the user's emotion has been identified and an appropriate response to it can be determined (mirrored or complementary), the trained bottleneck layer can be used to perform the needed transformation.

The deep neural network can include a bottleneck layer 1430. The bottleneck layer can include a fewer number of nodes than the one or more preceding hidden layers. The bottleneck layer can create a constriction in the deep neural network or other network. The bottleneck layer can force information that is pertinent to a classification into a low dimensional representation. The bottleneck features can be extracted using an unsupervised technique. In other embodiments, the bottleneck features can be extracted in a supervised manner. The supervised technique can include training the deep neural network with a known dataset. The features can be extracted from an autoencoder such as a variational autoencoder, a generative autoencoder, and so on. The deep neural network can include hidden layers 1440. The count of the hidden layers can include zero hidden layers, one hidden layer, a plurality of hidden layers, and so on. The hidden layers following the bottleneck layer can include more nodes than the bottleneck layer. The deep neural network can include a classification layer 1450. The classification layer can be used to identify the points, edges, objects, boundaries, and so on, described above. The classification layer can be used to identify cognitive states, mental states, emotional states, moods, and the like. The output of the final classification layer can be indicative of the emotional states of faces within the images, where the images can be processed using the deep neural network.

Figure 15:
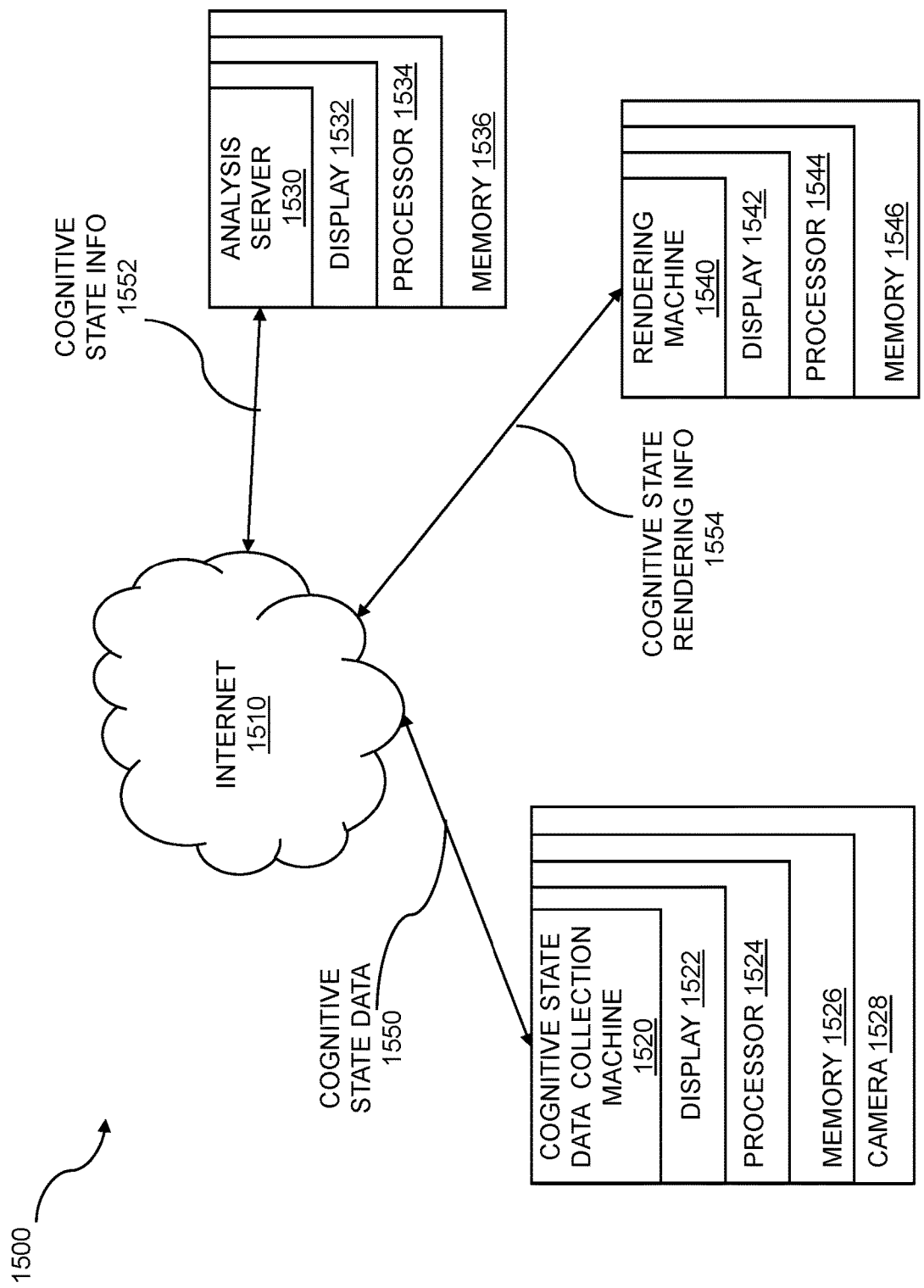
FIG. 15 is a system diagram for multidevice, multimodal emotion services monitoring.

FIG. 15 is a system diagram for multidevice, multimodal emotion services monitoring. The diagram illustrates an example system 1500 for multidevice, multimodal emotion services monitoring. The system 1500 can be used for expression analysis. The system 1500 can comprise a computer system for multi-device analysis comprising: a memory which stores instructions; one or more processors coupled to the memory wherein the one or more processors, when executing the instructions which are stored, are configured to: determine an expression to be detected, wherein the expression relates to a cognitive state of an individual; obtain input on the cognitive state of the individual using a first device local to the individual; monitor for the expression, using a background process on a second device remote from the individual; identify an occurrence of the expression, by the background process; and provide notification that the expression was identified, wherein the notification is provided from the background process to a third device, wherein the third device is distinct from the second device.

The system 1500 can include one or more client machines or cognitive state data collection machines or devices 1520 linked to an analysis server 1530 via the Internet 1510 or another computer network. The client machine 1520 can comprise one or more processors 1524 coupled to a memory 1526 which can store and retrieve instructions, a display 1522, and a camera 1528. The memory 1526 can be used for storing instructions, cognitive state data, cognitive state information, cognitive state analysis, expression analysis, and market research information. The display 1522 can be any electronic display, including but not limited to, a computer display, a laptop screen, a netbook screen, a tablet computer screen, a cell phone display, a mobile device display, a remote with a display, a television, a projector, or the like. The camera 1528 can comprise a video camera, still camera, thermal imager, CCD device, phone camera, three-dimensional camera, depth camera, multiple webcams used to show different views of a person, or any other type of image capture apparatus that can allow captured data to be used in an electronic system. The processor(s) 1524 of the cognitive state data collection machine 1520 can be configured to receive cognitive state data from people, and in some cases to analyze the cognitive state data to produce cognitive state information. The cognitive state information can be output in real time (or near real time), based on cognitive state data captured using the camera 1528. In other embodiments, the processor(s) 1524 of the client machine 1520 can be configured to receive cognitive state data from one or more people, analyze the cognitive state data 1550 to produce cognitive state information, and send the cognitive state information 1552 to the analysis server 1530.

The analysis server 1530 can comprise one or more processors 1534 coupled to a memory 1536 which can store and retrieve instructions, and a display 1532. The analysis server 1530 can receive cognitive state data and analyze the cognitive state data to produce cognitive state information so that the analyzing of the cognitive state data can be performed by a web service. The analysis server 1530 can use cognitive state data or cognitive state information received from the client machine 1520. This received data along with other data and information related to cognitive states and analysis of the cognitive state data can be considered cognitive state analysis information 1552 and can be transmitted to and from the analysis server using the Internet 1510 or another type of network. In some embodiments, the analysis server 1530 receives cognitive state data and/or cognitive state information from a plurality of client machines and aggregates the cognitive state information. The analysis server can evaluate expressions for cognitive states.

In some embodiments, a displayed rendering of cognitive state analysis can occur on a different computer than the client machine 1520 or the analysis server 1530. The machine performing the rendering can be termed a rendering machine 1540, and can receive cognitive state rendering information, cognitive state analysis information, cognitive state information, expressions, and graphical display information—collectively referred to as cognitive state rendering information 1554. In embodiments, the rendering machine 1540 comprises one or more processors 1544 coupled to a memory 1546 which can store and retrieve instructions, and a display 1542. The rendering can be any visual, auditory, or other form of communication directed towards one or more individuals, often comprising a notification. The rendering can include an email, a text message, a tone, an electrical pulse, or the like. The system 1500 can include a computer program product embodied in a non-transitory computer readable medium for multi-device analysis, the computer program product comprising code which causes one or more processors to perform operations of: determining an expression to be detected, wherein the expression relates to a cognitive state of an individual; obtaining input on the cognitive state of the individual using a first device local to the individual; monitoring for the expression, using a background process on a second device remote from the individual; identifying an occurrence of the expression, by the background process; and providing notification that the expression was identified, wherein the notification is provided from the background process to a third device, wherein the third device is distinct from the second device.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for multi-device analysis comprising:
   determining an expression to be detected, wherein the expression relates to a cognitive state of an individual;
   obtaining input on the cognitive state of the individual using a first device local to the individual;
   monitoring for the expression, using a background process on a second device remote from the individual;
   identifying an occurrence of the expression, by the background process;
   providing notification, to a foreground application, that the expression was identified, wherein the notification is provided from the background process to a third device, wherein the third device is distinct from the second device, wherein the foreground application comprises a social media application;
   enabling emotion services using two or more devices; and
   performing an emotion response action in response to the notification that was provided, wherein the emotion response action includes posting a message on a social media system.

2. The method of claim 1 wherein the expression is defined as a multimodal expression.

3. The method of claim 2 wherein the multimodal expression includes image data and audio data from the individual.

4. The method of claim 1 wherein the providing notification enables the emotion services.

5. The method of claim 4 wherein the emotion services are requested by the individual.

6. The method of claim 4 wherein the emotion services are requested by a third party.

7. The method of claim 1 wherein the first device and the third device are the same device.

8. The method of claim 1 wherein the background process is executed using a neural network.

9. The method of claim 1 wherein an application requests the notification.

10. The method of claim 9 wherein the application is running on the third device.

11. The method of claim 9 wherein the application is running on a fourth device.

12. The method of claim 1 wherein a camera sensor is on continuously as part of the monitoring.

13. The method of claim 1 wherein the providing includes delivering a coupon or a reward.

14. The method of claim 13 wherein the providing is part of a gaming experience.

15. The method of claim 1 wherein the expression is a reflection of a cognitive state.

16. The method of claim 1 wherein the identifying is provided with a confidence interval.

17. The method of claim 1 wherein the monitoring is accomplished passively.

18. The method of claim 1 wherein the identifying is enabled by inputting an expression description.

19. The method of claim 1 wherein the identifying is enabled by providing an expression contained in an image.

20. The method of claim 1 wherein the notification is provided using an expression contained in an image.

21. The method of claim 20 wherein the foreground application further comprises a messaging application configured to send messages between a sender and a recipient, and wherein, upon the recipient accessing a first message, the background process identifies an occurrence of the expression that was identified, and wherein the emotion response action includes sending a second message to the sender which includes emotion scoring, wherein the second message is indicative of an emotional response of the recipient in response to the first message.

22. The method of claim 21 wherein the second message further includes the image.

23. The method of claim 21 wherein the second message further includes an emoji.

24. The method of claim 20 wherein the social media application is configured to display a first message, and wherein, upon a recipient accessing the first message, the background process identifies an occurrence of the expression that was identified, and wherein the posting the message on the social media system includes emotion scoring, wherein the message, on the social media system that was posted, is indicative of an emotional response of the recipient in response to the first message.

25. The method of claim 20 wherein the social media application is configured to display a message, and wherein, upon a recipient accessing the message, the background process identifies an occurrence of the expression that was identified, and wherein the emotion response action includes generating an automatic like of the message.

26. The method of claim 20 wherein the emotion response action includes invoking an automated help application.

27. A computer program product embodied in a non-transitory computer readable medium for multi-device analysis, the computer program product comprising code which causes one or more processors to perform operations of:
 determining an expression to be detected, wherein the expression relates to a cognitive state of an individual;
 obtaining input on the cognitive state of the individual using a first device local to the individual;
 monitoring for the expression, using a background process on a second device remote from the individual;
 identifying an occurrence of the expression, by the background process;
 providing notification, to a foreground application, that the expression was identified, wherein the notification is provided from the background process to a third device, wherein the third device is distinct from the second device, wherein the foreground application comprises a social media application;
 enabling emotion services using two or more devices; and
 performing an emotion response action in response to the notification that was provided, wherein the emotion response action includes posting a message on a social media system.

28. A computer system for multi-device analysis comprising:
 a memory which stores instructions;
 one or more processors coupled to the memory wherein the one or more processors, when executing the instructions which are stored, are configured to:
 determine an expression to be detected, wherein the expression relates to a cognitive state of an individual;
 obtain input on the cognitive state of the individual using a first device local to the individual;
 monitor for the expression, using a background process on a second device remote from the individual;
 identify an occurrence of the expression, by the background process;
 provide notification, to a foreground application, that the expression was identified, wherein the notification is provided from the background process to a third device, wherein the third device is distinct from the second device, wherein the foreground application comprises a social media application;
 enable emotion services using two or more devices; and
 perform an emotion response action in response to the notification that was provided, wherein the emotion response action includes posting a message on a social media system.

\* \* \* \* \*